(12) United States Patent
Hajiaghayi

(10) Patent No.: US 8,238,251 B2
(45) Date of Patent: Aug. 7, 2012

(54) DESIGNING MINIMUM TOTAL COST NETWORKS USING ITERATIVE ROUNDING APPROXIMATION METHODS

(75) Inventor: Mohammad Hajiaghayi, Florham Park, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 914 days.

(21) Appl. No.: 12/315,657

(22) Filed: Dec. 5, 2008

(65) Prior Publication Data
US 2010/0142408 A1 Jun. 10, 2010

(51) Int. Cl.
G08C 15/00 (2006.01)
H04L 12/28 (2006.01)
G06F 15/173 (2006.01)

(52) U.S. Cl. .................... 370/238; 370/255; 709/241

(58) Field of Classification Search .............. 370/238, 370/255, 256; 709/241
See application file for complete search history.

(56) References Cited

U.S. PATENT DOCUMENTS

| | | | |
|---|---|---|---|
| 6,928,484 B1 | 8/2005 | Huai et al. | |
| 2001/0018759 A1* | 8/2001 | Andreev et al. | 716/7 |
| 2004/0049595 A1* | 3/2004 | Sun et al. | 709/238 |
| 2006/0146716 A1* | 7/2006 | Lun et al. | 370/238 |
| 2009/0222782 A1* | 9/2009 | Bayati et al. | 716/7 |

OTHER PUBLICATIONS

D. Bienstock, M. X. Goemans, D. Simchi-Levi, and D. Williamson, A note on the prize collecting traveling salesman problem, Math. Programming, 59 (1993), pp. 413-420.
E. Balas, The prize collecting traveling salesman problem, Networks, 19 (1989), pp. 621-636.
M. X. Goemans and D. P. Williamson, A general approximation technique for constrained forest problems, SIAM J. Comput., 24 (1995), pp. 296-317.
M. T. Hajiaghayi and K. Jain, The prize-collecting generalized Steiner tree problem via a new approach of primal-dual schema, in Proceedings of the Seventeenth Annual ACM-SIAM Symposium on Discrete Algorithms, New York, 2006, ACM, pp. 631-640.
Y. Sharma, C. Swamy, and D. P. Williamson, Approximation algorithms for prize collecting forest prob-lems with submodular penalty functions, in Proceedings of the eighteenth annual ACM-SIAM symposium on Discrete algorithms (SODA '07), Philadelphia, PA, USA, 2007, Society for Industrial and Applied Mathematics, pp. 1275-1284.
A. Gupta, J. Konemann, S. Leonardi, R. Ravi, and G. Schafer, An efficient cost-sharing mechanism for the prize-collecting Steiner forest problem, in Proceedings of the eighteenth annual ACM-SIAM symposium on Discrete algorithms (SODA '07), Philadelphia, PA, USA, 2007, Society for Industrial and Applied Mathematics, pp. 1153-1162.
K. Jain, A factor 2 approximation algorithm for the generalized Steiner network problem, Combinatorica, 21 (2001), pp. 39-60.

* cited by examiner

*Primary Examiner* — Dang Ton
*Assistant Examiner* — Ryan Kavleski

(57) ABSTRACT

Minimum cost networks, such as fiber optic networks used in telecommunications, are obtained by defining available network elements having cost, required pairs, connectivity and penalty cost values and selecting from these available elements using an iterative rounding approximation method that constructs an LP relaxation incorporating the element parameters, finds an optimal basic solution, applies a selection criterion to pairs and edges in the optimal basic solution, and constructs a residual LP relaxation with selected pairs and edges. By fixing selected pairs and edges values to 1 in the residual LP, successive iterations of the method provide a design which is a 3-approximation solution to the minimum cost design problem.

27 Claims, 9 Drawing Sheets

DESIGNING MINIMUM TOTAL COST NETWORKS USING ITERATIVE ROUNDING APPROXIMATION METHODS

FIELD OF THE INVENTION

The present invention generally relates to network design, and more particularly to a method and system for designing minimum total cost networks, to a computer program product for performing such methods, and to networks designed according to such methods.

BACKGROUND OF THE INVENTION

Network design applies to many fields of commercial interest. One example is overnight package delivery, where packages must be delivered between cities over a network of possible air routes that have different costs. Another example is utility design, where a commodity such as electricity or water is to be distributed to geographically separate customers over a network of possible conduits that have different costs. The field of telecommunications contains several examples in which possible transmission elements, with different costs, may be combined in many different ways, between different points, in order to obtain a network of paths between the points. One example arises in the design of a fiber optic transmission network (e.g., one using fiber optic links between routers as part of an ISP network) to join geographically dispersed major cities, with possible alternate routes between cities having different costs (which may be defined in terms of the construction costs of providing the route, for example).

In each of these network examples, it is desirable to be able to employ a method or algorithm which will provide the minimum cost network by selecting, from the possible network elements, those which provide the lowest total cost. A minimum cost network designed according to such a method will allow lower cost services to customers using such a network and give a competitive advantage to the service provider using such a network.

The overall network design context may include additional considerations. For example, the network design criteria may require that the network include pairs of selected points, e.g., certain city pairs. The design problem then is to find the minimum cost network solution that contains paths between each of these paired points.

The network design criteria may further assign penalty costs if a required path between selected points is not included. An example of such a penalty cost in the package delivery context is the cost of leasing another carrier's air transport facilities for a package delivery route segment not covered by the package deliverer's own network. In the telecommunications context, an example of such a penalty cost is the cost of leasing telecommunications transmission capacity from another provider for a route segment not provided by a provider's own network. Allowing penalty costs supplies the opportunity for a lower overall cost network. The network design problem, with this additional consideration, is then to find a network solution that minimizes the total combined costs of selected network elements plus penalties incurred for having any required points unconnected by the selected elements.

Finding a network whose design considerations include a minimization of cost, the selection of elements with assigned costs, the requirement that the solution include pairs of selected points, and the allowance of assigned penalty costs if a required pair of points is not connected by the selected elements, is a design problem corresponding mathematically to the Prize Collecting Steiner Forest (PCSF) problem. Mathematically, the network of possible elements is a graph $G=(V, E)$ where V is the set of vertices $v_i, v_j, \ldots$, and E is the set of edges $e_{ij}$ connecting vertices $v_i, v_j$, with a set of required pairs $\mathcal{P}=\{(s_1,t_1), (s_2,t_2), \ldots (s_\ell,t_\ell)\}$, a non-negative cost function c: $E \rightarrow Q+$ (which means the function maps the set E into a set of positive rational numbers), and a non-negative penalty function $\pi$: $\mathcal{P} \rightarrow Q+$. Each edge has a cost $c_{ij}$ and each pair $\mathcal{P}_k$ has a penalty $\pi_k$ that is incurred if the pair vertices $s_k, t_k$ are not connected to an edge. The goal is to find a set (or forest) H that minimizes the costs of the edges of H plus the penalties paid for pairs whose vertices are not all connected by H. In other words, the goal is a minimum-cost way of buying a set of edges and paying the penalty for those pairs which are not connected via bought edges.

A simple example of such a network is shown in FIG. 1. The graph G of potential network elements includes hollow circle vertices that are denoted with upper case letters A, B, C, D, F and J and represent cities, for example. The solid circles denoted with lower case letters a, b, c, d and f represent non-city vertices. Edges e representing transmission links, for example, that are available to be included in the network, are denoted by solid lines linking vertices as shown. Each edge $e_{ij}$ has a cost $c_{ij}$. Required pairs of vertices $\mathcal{P}_1, \mathcal{P}_2, \mathcal{P}_3, \mathcal{P}_4$, representing cities that are required to be connected in the network, have respective penalty costs $\pi_1, \pi_2, \pi_3, \pi_4$, that are incurred if the vertices in the pair are not joined to a selected edge.

A minimal cost solution H to the graph G of FIG. 1 is shown in FIG. 1A, where solid lines represent edges selected from those available in FIG. 1, and dashed lines show penalty connections. The connection for required pair AB is furnished by penalty $\pi_1$; for pair BC by edges Bc, cD; for pair CD by edge CD; and for pair DF by edges DC, Cc, cJ and JF.

The Prize Collecting Steiner Forest (PCSF) problem has been solved for special cases. In the special case that all sinks are identical, i.e., there is a common root r in every pair $\mathcal{P}_k$ in the PCSF problem, the problem reduces to the classic Prize-Collecting Steiner Tree problem. Bienstock, Goemans, Simchi-Levi, and Williamson [D. BIENSTOCK, M. X. GOEMANS, D. SIMCHI-LEVI, AND D. WILLIAMSON, *A note on the prize collecting traveling salesman problem*, Math. Programming, 59 (1993), pp. 413-420] first considered this tree problem (based on a problem earlier proposed by Balas [E. BALAS, *The prize collecting traveling salesman problem*, Networks, 19 (1989), pp. 621-636]) for which they gave a 3-approximation algorithm. The current best approximation algorithm for this tree problem is a primal-dual $2-1/(n-1)$ approximation algorithm (n is the number of vertices of the graph) due to Goemans and Williamson [M. X. GOEMANS AND D. P. WILLIAMSON, *A general approximation technique for constrained forest problems*, SIAM J. Comput., 24 (1995), pp. 296-317].

The general form of the PCSF problem first was formulated by Hajiaghayi and Jain [M. T. HAJIAGHAYI AND K. JAIN, *The prize-collecting generalized Steiner tree problem via a new approach of primal-dual schema*, in Proceedings of the Seventeenth Annual ACM-SIAM Symposium on Discrete Algorithms, New York, 2006, ACM, pp. 631-640]. They showed how by a primal-dual algorithm to a novel integer programming formulation of the problem with doubly-exponential variables, it is possible to obtain a 3-approximation algorithm for the problem. In addition, they show that the factor 3 in the analysis of their algorithm is tight. However they show how a direct randomized LP rounding algorithm with approximation factor 2.54 can be obtained for this problem. Their approach has been generalized by Sharma, Swamy, and Williamson [Y. SHARMA, C. SWAMY, AND D. P. WILLIAMSON, *Approximation algorithms for prize collecting forest problems with submodular penalty functions*, in Proceedings of the eighteenth annual ACM-SIAM symposium on Discrete algorithms (SODA '07), Philadelphia, Pa., USA, 2007, Society for Industrial and Applied Mathematics, pp. 1275-1284] for network design problems where violated arbitrary 0-1 connectivity constraints are allowed in exchange for a very general penalty function. The work of Hajiaghayi and Jain has also motivated a game-theoretic version of the problem considered by Gupta et al. [A. GUPTA, J. KONEMANN, S. LEONARDI, R. RAVI, AND G. SCHAFER, *An efficient cost-sharing mechanism for the prize-collecting Steiner forest problem*, in Proceedings of the eighteenth annual ACM-SIAM symposium on Discrete algorithms (SODA '07), Philadelphia, Pa., USA, 2007, Society for Industrial and Applied Mathematics, pp. 1153-1162].

Besides the network design criteria that are able to be considered by the PCSF problem, it may be useful to be able to impose a further network design consideration, namely that of providing a desired redundant connectivity between required points (measured in terms of numbers of required alternate edge disjoint paths between the points). For example, in order to provide for continued service in the event of a failure of a selected network element, such as breakage of a fiber optic cable, it may be required that selected points (vertices) be connected with two or more redundant edge disjoint paths (commonly referred to a k-coverage when the design is to include k redundant paths between points). An example of a method for finding such independent edge disjoint paths in a network context is shown in U.S. Pat. No. 6,928,484.

Finding a network whose design considerations include a minimization of cost, the selection of elements with assigned costs, the requirement that the solution include pairs of selected points, the requirement of multiple connectivity between selected pairs of points and the allowance of assigned penalty costs if a required pair of points is not connected by the required number of elements, is a design problem corresponding mathematically to the Prize Collecting Survivable Steiner Network (PCSSN) problem. Mathematically, the network of possible elements is a graph G=(V, E) where V is the set of vertices $v_i$, $v_j$, ... and E is the set of edges $e_{ij}$, with a set of required pairs $\mathcal{P}=\{(s_1,t_1), (s_2,t_2), \ldots (s_\ell,t_\ell)\}$, a non-negative cost function c: E→Q+, connectivity requirements $r_{uv}$ for all pairs of vertices u and v, and a non-increasing non-negative marginal penalty function π: $\mathcal{P}$→Q+ for u and v in case we cannot satisfy all $r_{uv}$. Each edge has a cost $c_{ij}$ and each pair $\mathcal{P}_k$ has a penalty $\pi_k$ that is incurred if the pair vertices $s_k,t_k$ are not all connected by edges in accordance with connectivity requirement $r_{uv}$. The goal is to find a minimum way of constructing a network (graph) H in which we connect u and v with $r'_{uv} \leq r_{uv}$ edge-disjoint paths and pay the marginal penalty for each of the $r_{uv}-r'_{uv}$ occurrences of violated connectivity between u and v.

A simple example of such a network is shown in FIG. 2. As in FIG. 1, the graph G of potential network elements includes hollow circle vertices that are denoted with upper case letters A, B, C, D, F and J and represent cities, for example. The solid circles denoted with lower case letters a, b, c, d and f represent non-city vertices. Edges e representing transmission links, for example, that are available to be included in the network are denoted by solid lines linking vertices as shown. Each edge $e_{ij}$ has a cost $c_{ij}$. Required pairs of vertices $\mathcal{P}_1$, $\mathcal{P}_2$, $\mathcal{P}_3$, $\mathcal{P}_4$, representing cities that are required to be connected in the network, have connectivity requirements $r_1$, $r_2$, $r_3$, $r_4$. In the example of FIG. 2, $r_1$, $r_2$, $r_3$ are each 2 and $r_4$ is 4. Non-increasing non-negative marginal penalty costs $\pi_{11}$ and $\pi_{21}$, for $r_1$; $\pi_{21}$ and $\pi_{22}$ for $r_2$; $\pi_{31}$ and $\pi_{31}$ for $r_3$; and $\pi_{41}$, $\pi_{42}$, $\pi_{43}$ and $\pi_{44}$ for $r_4$ are available to be incurred for each instance in which we fail to satisfy a required pair's connectivity requirement with selected edges.

A minimum cost solution H to the graph G of FIG. 2 is shown in FIG. 2A, where solid lines represent edges selected from those available in FIG. 2, and dashed lines show penalty connections. The 2-fold connection for required pair AB is furnished by penalty $\pi_{11}$ and edges Ab, bB; for pair BC by penalty $\pi_{21}$ and edges Bc, cD; for pair CD by edge CD and edges Cd, dD; and the 4-fold connection for pair DF is furnished by two penalties $\pi_{41}$, $\pi_{42}$; edges DC, Cc, cJ, JF; and edges Dd, df, fF.

When all connectivity requirements $r_{uv}$ are 1, the PCSSN problem reduces to the PCSF problem described above. When all penalties π are ∞, the PCSSN problem reduces to the special case of the classic survivable Steiner network design problem. For this problem, Jain [K. JAIN, *A factor 2 approximation algorithm for the generalized Steiner network problem*, Combinatorica, 21 (2001), pp. 39-60], using the method of iterative rounding, obtained a 2-approximation algorithm, improving on a long line of earlier research that applied primal-dual methods to this problem.

Jain's iterative rounding approach has been limited to the non-prize collecting context of the classic problem he addresses, with no provision for penalties, and does not provide feasible solutions to the Prize Collecting Survivable Steiner Network problem, which heretofore have not been found.

The chief problem encountered in finding an optimum network design solution in context of PCSF and PCSSN is that for all but trivial configurations, which means that for all configurations actually encountered in the real world of network design, methods providing exact solutions may be devised but they are not feasible because they require too much time to compute. For example, it would be possible to obtain an exact solution by making a brute force comparison of the costs of all possible network element permutations but years of computation time would be needed for routinely complex networks. Accordingly, methods providing approximate solutions have been sought. Approximation methods have, for the most part, used linear program solving techniques to solve optimization problems in which the variables correspond to the physical attributes (locations, connection cost, penalties, connectivity) of the network elements. However, approximation methods often must make limiting assumptions in order to be solvable using known ellipsoidal or flow-based LP-solver techniques. Additionally, approximation algorithms must provide some measure of how closely the approximate solution is to an optimal solution, which means that an approximation solution must be mathematically demonstrated to be within a factor p of the optimum solution (such an algorithm is referred to as a p-approximation algorithm). To prove the approximation has a specified degree of accuracy, limiting assumptions may be made that may reduce the generality of the methods in dealing with actual design applications.

Thus approximation methods must find a suitable balance among three considerations: the computation time needed to perform them, the computational power needed to perform them, and the degree to which the result can be shown to compare to an optimum result. Moreover, techniques that are known to be useful in some situations, such as primal-dual solutions, or randomized rounding solutions, cannot generally be extended in any straightforward manner to more complicated networks' additional variables.

Accordingly, there is a need to provide an approximation algorithm for use in network design methods that can provide solutions when network design criteria correspond to a PCSF or a PCSSN. There is a further need to provide such an approximation algorithm that further has a suitable approximation factor, that can use existing LP-solvers, and that can find solutions using reasonable computational resources in a reasonable time.

BRIEF SUMMARY OF THE INVENTION

Briefly, the present invention is a method for designing minimum cost networks by selecting from a collection of possible network elements those which provide a minimum total cost given further network design constraints. The present invention, for the first time, uses an iterative rounding approach for prize-collecting versions of Steiner forest problems and more generally to survivable Steiner network design. To the best of our knowledge, this method of iterative rounding has not been used in a prize-collecting context, even for the classic prize-collecting Steiner tree.

In a first exemplary embodiment, the iterative rounding algorithm is used in a method to find minimum cost networks by selecting network elements with assigned costs where the design requires either the connection of network elements to required pairs of nodes (vertices) or alternatively the payment of penalty costs for failure to connect any node of a pair to a network element (edge). The first embodiment creates a PCSF problem incorporating the network cost and other constraints, finds an approximate solution to the PCSF problem using the iterative rounding algorithm, and then uses elements in the solution in the network design. In a second embodiment, the iterative rounding algorithm is used in a method to find minimum cost networks by selecting network elements with assigned costs where the design requires a specified connectivity of network elements between pairs of nodes (vertices) or the payment of penalty costs for failure to connect any node pair with network elements to the required degree of connectivity. The second embodiment creates a PCSSN problem incorporating the network cost and other constraints, finds an approximate solution to the PCSSN problem using the iterative rounding algorithm, and then uses elements in the solution in the network design.

In a specific embodiment, the iterative rounding algorithm for finding an approximate solution to a minimum cost network according to the invention puts the network element parameters of edge costs, required pairs, and penalties in linear program form, obtains a first feasible solution to the linear program in terms of element coefficients, sets a threshold $\alpha$ for the coefficients in the solution, pays penalties for pairs with coefficients exceeding the threshold $\alpha$ and includes the paid penalties in the network solution, selects edges with coefficients exceeding the threshold $\alpha$ and includes the edges in the network solution, constructs a residual graph including all the edges and the pairs remaining after removing penalties, sets coefficient values of selected edges to 1 in the residual graph, obtains a feasible solution to a linear program for the residual graph, and repeats these steps until it is determined that all required pairs connectivity requirements have been met either by connection to selected edge elements or by payment of non-connection penalties. The solution obtained by this iterative rounding process can be proven to be a 3-approximation solution and it is preferable to select $\alpha=\frac{1}{3}$.

In another embodiment of the invention, instead of selecting all pair penalties and edges whose coefficients exceed the threshold $\alpha$, the method proceeds by choosing in each iteration the pair penalty with the maximum coefficient value and the edge with the maximum coefficient value, and then proceeding as described above. By removing in each iteration only the maximum coefficient valued penalties and edges, the method will find solutions that are nearer to optimal solutions, but at the cost of increased processing time.

The iterative rounding algorithm according to the invention provides a solution to PCSF and PCSSN problems heretofore unavailable. The solution is a 3-approximation algorithm, which means that the solution in the worst case is within a factor of 3 of optimal. In practice, the solutions found by the algorithm can be exact. Thus a number of practical network design problems, such as designing a minimal cost telecommunications fiber optic network, or a minimal cost package delivery network, can be solved using methods that use readily available LP-solvers and steps that are easily put into computer program form, to be executed by standard computer systems. The invention advantageously provides a solution with greater generality than previous solutions, is simple in form and thus easily implemented and able to be performed without exorbitant demands in terms of time and equipment.

In other aspects, the invention includes network design systems operating in accordance with the invention, and computer readable program means for causing a computer to perform the methods of the invention. In a further aspect, the invention includes networks with elements selected according to the methods of the invention.

These and other objects, aspects, advantages and features of the invention are set forth in the attached description.

BRIEF DESCRIPTION OF THE DRAWINGS

The foregoing summary of the invention, as well as the following detailed description of the preferred embodiments, is better understood when read in conjunction with the accompanying drawings, which are included by way of example and not by way of limitation with regard to the claimed invention:

DETAILED DESCRIPTION OF THE INVENTION

Figure 1:
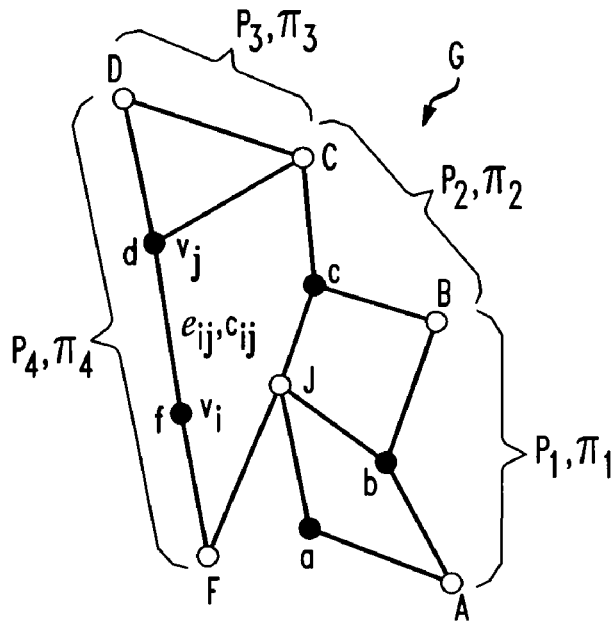
FIG. 1 shows a network graph of a type corresponding to a PCSF.
Figure 1A:
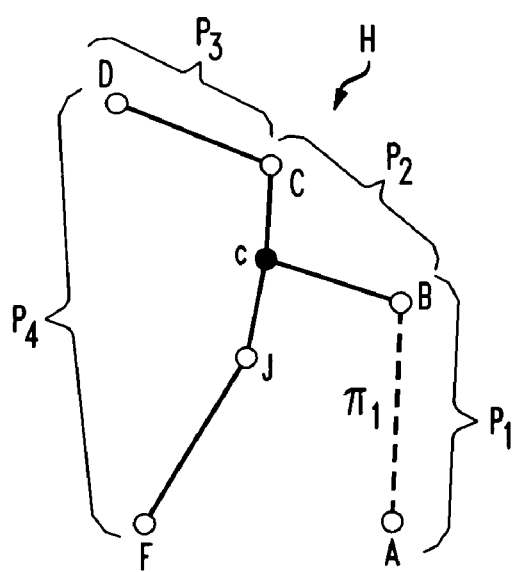
FIG. 1A shows a minimum-cost solution of the network graph of FIG. 1, of a type which may be found using an iterative rounding method according to the invention.
Figure 3A:
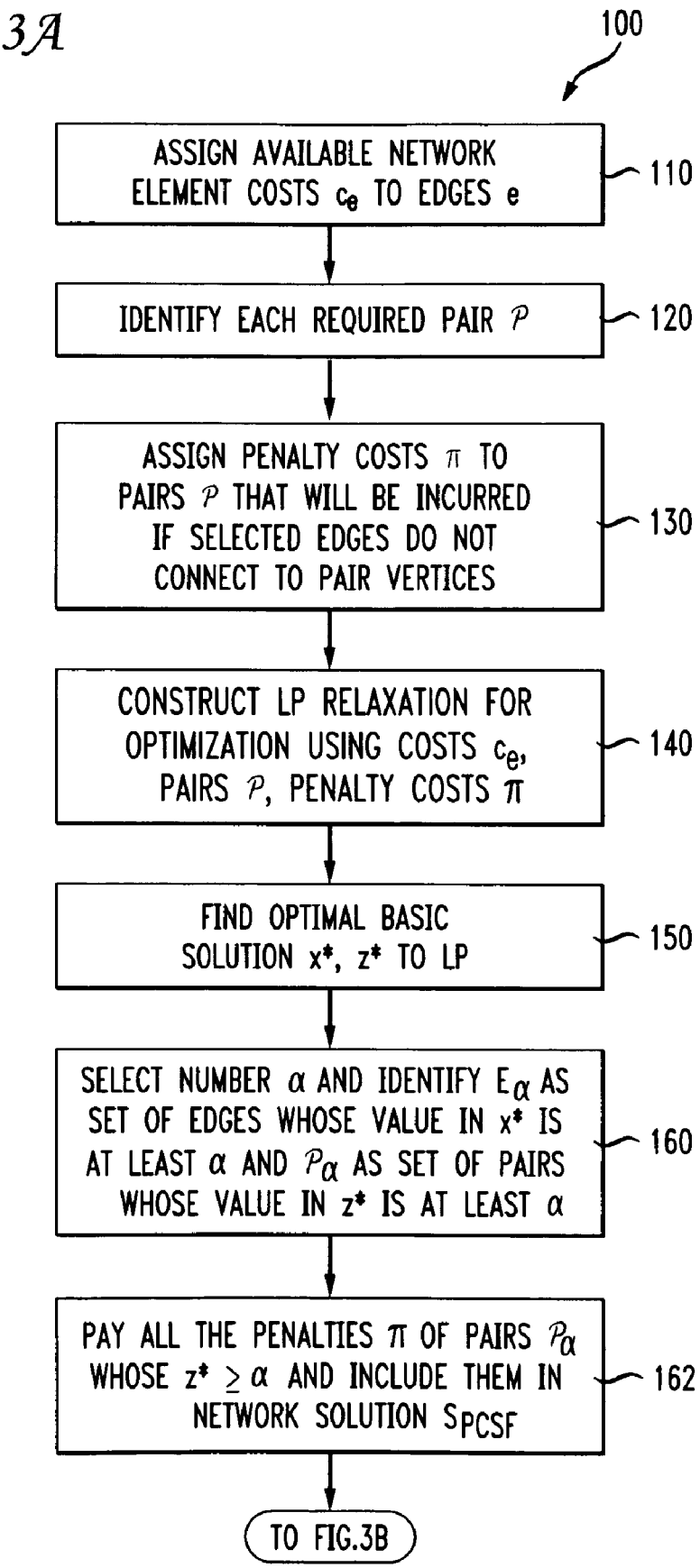
FIGS. 3A and 3B form a flowchart showing a method for designing a network according to the invention.
Figure 3B:
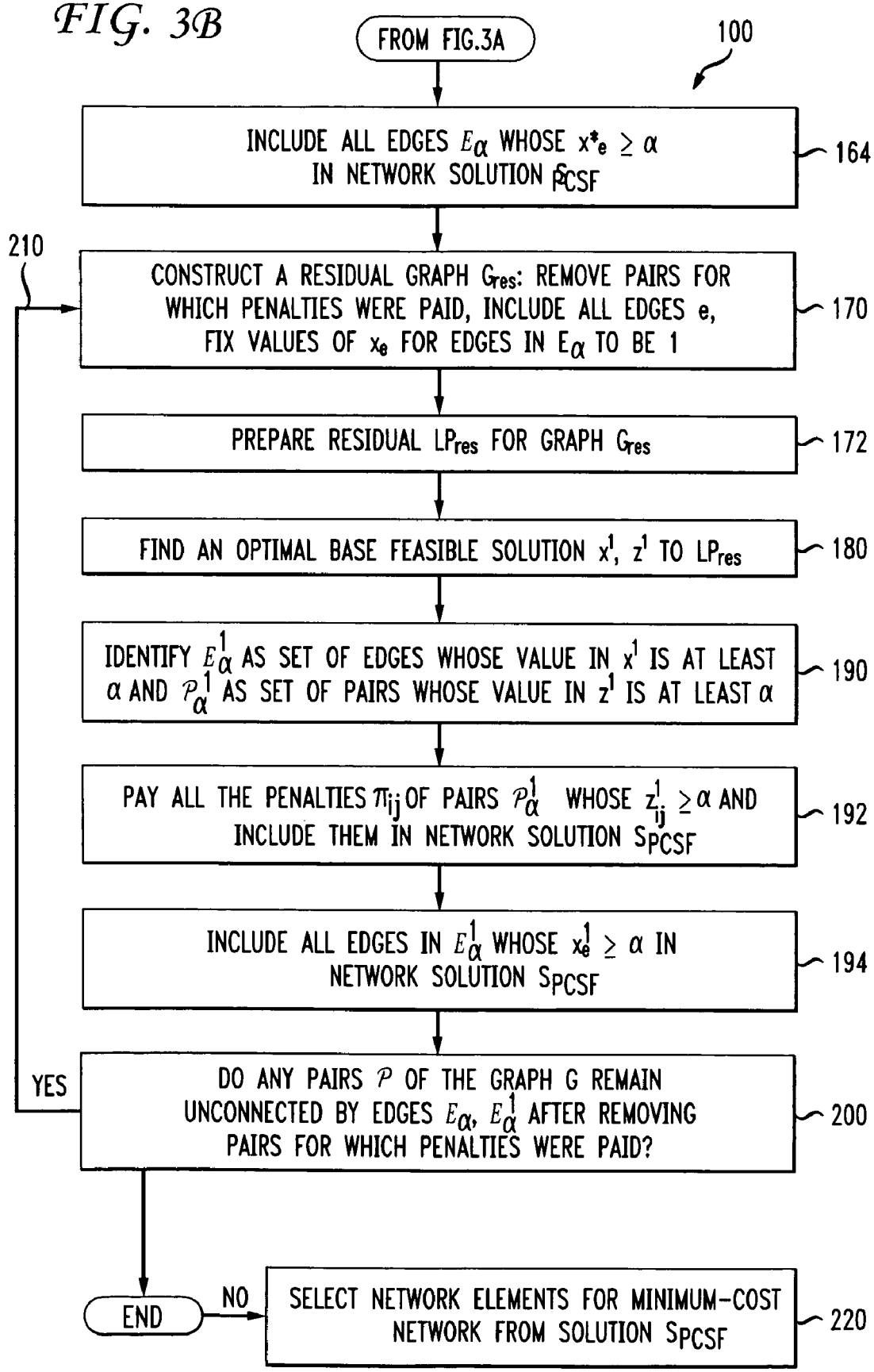

FIGS. 3A and 3B together form a flowchart showing a method 100 for designing a network according to the invention. Method 100 may be thought of as a computer routine, or a calculation module to be operated by a computer. Method 100 finds a solution to a PCSF whose variables correspond to the costs, required locations and penalties associated with the elements of a physical network to be designed. Thus method 100 will operate on a set of possible network elements as shown in FIG. 1 and will find a minimum cost network as shown in FIG. 1A.

As discussed above, the desired network includes elements selected from a set of possible elements corresponding to graph edges, each of which has a cost. In a fiber optic network design, for example, the edge elements will be point-to-point routes (e.g., city to city) and the costs may be construction costs such as those that may be encountered in installing fiber optic cable between city A and city B. In step 110, the method 100 assigns these available network elements costs $c_e$ to edges e.

Also as discussed above, the network solution is to include certain required pairs, which correspond to graph vertices. In a fiber optic network design, for example, the required pairs may represent pairs of cities (New York and Washington, New York and Philadelphia, Philadelphia and Richmond, etc,) that must be included in any solution. In step 120, the method identifies each of these required pairs $\mathcal{P}$.

In step 130, the method assigns penalty costs $\pi$ to the required pairs $\mathcal{P}$ that will be incurred if selected network elements do not connect them. In a fiber optic network design, for example, the penalty costs may represent the cost of leasing transmission capacity from a competing carrier in order to connect the two cities of the required pair.

In step 140, the method constructs a natural LP for the optimization problem. As an example, the traditional LP relaxation for the PCSF problem which can be solved using the Ellipsoid algorithm is as follows:

$$OPT = \text{minimize} \sum_{e \in E} c_e x_e + \sum_{i,j \in P} \pi_{ij} z_{ij}$$

$$\text{subject to} \sum_{e \in \partial(S)} x_e + z_{ij} \geq 1 \quad \forall S \subset V, (i,j) \in P, S \otimes (i,j)$$

$$x_e \geq 0 \quad \forall e \in E$$

$$z_{ij} \geq 0 \quad \forall (i,j) \in P$$

Here for a set $S \subset V$, we denote $|\{i,j\} \cap S| = 1$ by $S \otimes (i,j)$.

In this LP $x_e$ and $z_{ij}$ are variable coefficients of the $c_e$ and $\pi_{ij}$ to be solved for in the minimum solution. The notation $\delta(S)=$ the set of all edges that are cut by cut $(S:\overline{S})$.

The LP relaxation written as the cut-based LP set forth in line (1) above alternatively may be written as a standard flow-based LP in which case one would use LP-solver algorithms for a polynomial number of variables and constraints. The choice of which form of LP to use will depend on practical considerations, such as which form is easier to solve using available LP-solver software.

Referring again to FIG. 3A, the method proceeds in step 150 by finding an optimal basic solution $x^*, z^*$ to the LP of step 140. Such a solution may be obtained by using an LP-solver such as the CPLEX® solver provided by ILOG, Inc. of Sunnyvale, Calif., USA. In such an optimal solution, the coefficients $x^*, z^*$ will be non-integer fractional numbers, which do not provide a workable network solution as it is not possible to create a real network out of fractional edges or fractional penalties.

Using the optimal basic solution $x^*, z^*$ to the LP of step 140, in step 160 the method then selects a number $\alpha$ to be used as a threshold, $0 < \alpha \leq 1$, and then identifies $E_\alpha$ as the set of edges whose value in $x^*$ is at least the threshold $\alpha$ and identifies $\mathcal{P}_\alpha$ as the set of pairs whose value in $z^*$ is at least the threshold $\alpha$. As will be explained below, it can be shown that when $\alpha = \frac{1}{3}$, an iterative rounding algorithm in accordance with the steps of method 100 will produce a minimum-cost 3-approximation algorithm solution. Accordingly, it is advantageous to select $\alpha = \frac{1}{3}$. Use of a lower threshold, such as $\frac{1}{4}$, would produce a 4-approximation algorithm; use of a higher threshold, such as $\frac{1}{2}$, would not assure that all iterations would advance to a solution.

Next in step 162, for the set $\mathcal{P}_\alpha$ we pay all the penalties $\pi_{ij}$ of pairs $(i, j)$ whose $z^*_{ij} \geq \alpha$ and include these penalties in a minimum-cost network final solution $S_{PCSF}$. (It will be understood that when we say we "pay" the penalties, we do not actually pay the penalty at this design stage of a network but signify that we choose to pay the penalty when the network is realized. For convenience, however, we shall refer to payment of a penalty as including designating a certain penalty to be paid later.) We may now remove these pairs with paid penalties from further consideration in the succeeding steps of method 100 to select other network elements for the solution.

In step 164, for the set $E_\alpha$ we select all edges e whose $x^*_e \geq \alpha$ and include them in the minimum-cost network final solution $S_{PCSF}$.

Figure 1B:
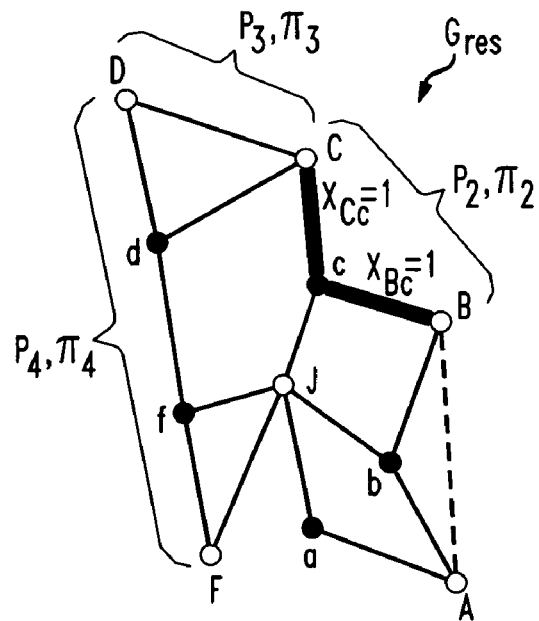
FIG. 1B shows a residual graph used by an iterative rounding method according to the invention to find the minimum-cost solution of FIG. 1A.

In step 170 the method forms another graph $G_{res}$ as follows: (1) we remove any pairs $\mathcal{P}_\alpha$ for which we paid a penalty in step 162, but retain the remaining pairs; (2) we include all edges in E, including the edges $E_\alpha$; (3) however, we fix all values of $x_e$ of edges in $E_\alpha$ to be 1. FIG. 1B shows an example of a graph $G_{res}$ for the graph of FIG. 1, where P1 has had penalty $\pi_1$ paid, and edges Bc and cC, shown by heavy lines, have been selected. We show $x_{Bc}$ and $x_{cC}$ both equal to 1 but the $x_e$ for the remaining edges remain as variables.

In step 172 we then prepare a residual LP for graph $G_{res}$, referred to as $LP_{res}$, with a new $OPT_{res}$ as follows, where we define $E_{res} = E - E_\alpha$ and $\mathcal{P}_{res} = \mathcal{P} - \mathcal{P}_\alpha$:

$$OPT_{res} = \text{minimize} \sum_{e \in E} c_e x_e + \sum_{i,j \in P_{res}} \pi_{ij} z_{ij}$$

$$\text{subject to} \sum_{e \in \partial(S)} x_e + \sum_{k=1}^{r_{ij}} z_{ij}^k \geq r_{ij} \quad \begin{array}{l} \forall S \in V, (i,j) \in P_{res}, \\ S \otimes (i,j), \partial(S) \cap E_\alpha = 0 \end{array}$$

$$x_e \geq 0 \quad \forall e \in E_{res}$$

$$z_{ij} \geq 0 \quad \forall (i,j) \in P_{res}$$

$$x_e = 1 \quad \forall e \in E_\alpha$$

Note in $LP_{res}$ that by including edges in $E_\alpha$ with $x_e = 1$ and ignoring further consideration of pairs in $\mathcal{P}_\alpha$ we always produce another LP similar in form to that for OPT in step 140. Indeed, the only differences between OPT and $OPT_{res}$ lie in their constraints, which recognize that the new optimization problem concerns a subset of the original graph G. It will be understood by those of skill in the art that the step of constructing a residual graph may include a step of contracting those selected edges whose coefficients are set to 1 in the residual graph. Moreover, if LP were written as a flow-based LP, the new $LP_{res}$ would be similar in form to that LP.

Next, in step 180, the method finds an optimal basic feasible solution $x^1$, $z^1$ to $LP_{res}$ using an LP solver such as the CPLEX® solver referred to above.

Using the optimal basic feasible solution $x^1$, $z^1$ to $LP_{res}$ found in step 180, in step 190 the method identifies $E_\alpha^1$ as the set of edges whose value in $x^1$ is at least $\alpha$ and identifies $\mathcal{P}_\alpha^1$ as the set of pairs whose value in $z^1$ is at least $\alpha$, in the manner described above in step 160.

In step 192 for the pairs $\mathcal{P}_\alpha$ we pay all the penalties $\pi_{ij}$ of pairs (i,j) whose $z^1_{ij} \geq \alpha$ and include these penalties in a minimum-cost network final solution $S_{PCSF}$.

In addition, in step 194 for the edges $E_\alpha^1$ we include all edges e whose $x^1_e \geq \alpha$ in the minimum-cost network final solution $S_{PCSF}$.

In step 200 we determine if any there are any pairs P of the graph G, after removing pairs $\mathcal{P}_\alpha + \mathcal{P}_\alpha$ for which penalties have been paid, that remain unconnected by the selected edges $E_\alpha + E_\alpha^1$. If yes, the method returns back to step 170 via path 210 to form a new $G_{res}^1$ in which define $E_{res}^1 = E - E_\alpha - E_\alpha^1$ and we define $\mathcal{P}_{res}^1 = \mathcal{P} - \mathcal{P}_\alpha - \mathcal{P}_\alpha^1$, we fix all values of $x_e$ of edges in $E_\alpha$ and $E_\alpha^1$ to be 1 and then loop iteratively through steps 180 through 200 until no original pairs of the graph G remain unconnected by selected edges or have not been accounted for by paying a penalty. If it is determined that no such original pairs of the graph G remain, i.e., that all pair connectivity requirements have been satisfied, the iteration stops and the minimum cost network solution $S_{PCSF}$ to OPT is obtained as the union of the pairs $\mathcal{P}_\alpha, \mathcal{P}_\alpha^1, \ldots$ for which the penalties $\pi_{ij}$ have been paid and the edges $E_\alpha, E_\alpha^1, \ldots$ which were selected to be included. FIG. 1A shows such a minimum cost network obtained as a result of the iterative rounding steps of method 100 through successive versions of $G_{res}$, one of which is shown in FIG. 1B. The cost of the network is then the sum of the penalties for the pairs $\mathcal{P}_\alpha, \mathcal{P}_\alpha^1, \ldots$ and the edge costs $c_{ij}$ for the edges $E_\alpha, E_\alpha^1, \ldots$.

Then, in step 220, the solution $S_{PCSF}$ is used to select network elements, and penalty alternatives, for the physical network that method 100 is used to design. The selected network elements may include all the penalty and edge elements identified by method 100, or may choose only a subset of those elements if other design requirements are present. In the fiber optic example given previously, these network elements will be the fiber optic links that provide connections between cities, and the penalty alternatives will be the lease costs of providing service through other providers to cities unconnected by the selected fiber optic links.

It can be proven that the iterative rounding method 100 provides a 3-approximation feasible solution to OPT, and thus to PCSF, and enables a minimum cost network to be designed with a cost solution that is at most a factor of three greater than the optimum cost. While the proof establishes there is a worst case bound of three, in practice the algorithm seems to perform much better than this, and often will produce the optimal solution or a near-optimal solution.

The proof that method 100 provides a 3-approximation feasible solution to OPT, which is lengthy, appears in the Appendix.

The steps of method 100 described above may be embodied in routines in a computer program, capable of being operated by a standard computer system such as the one shown in FIG. 6 and described below.

Figure 4A:
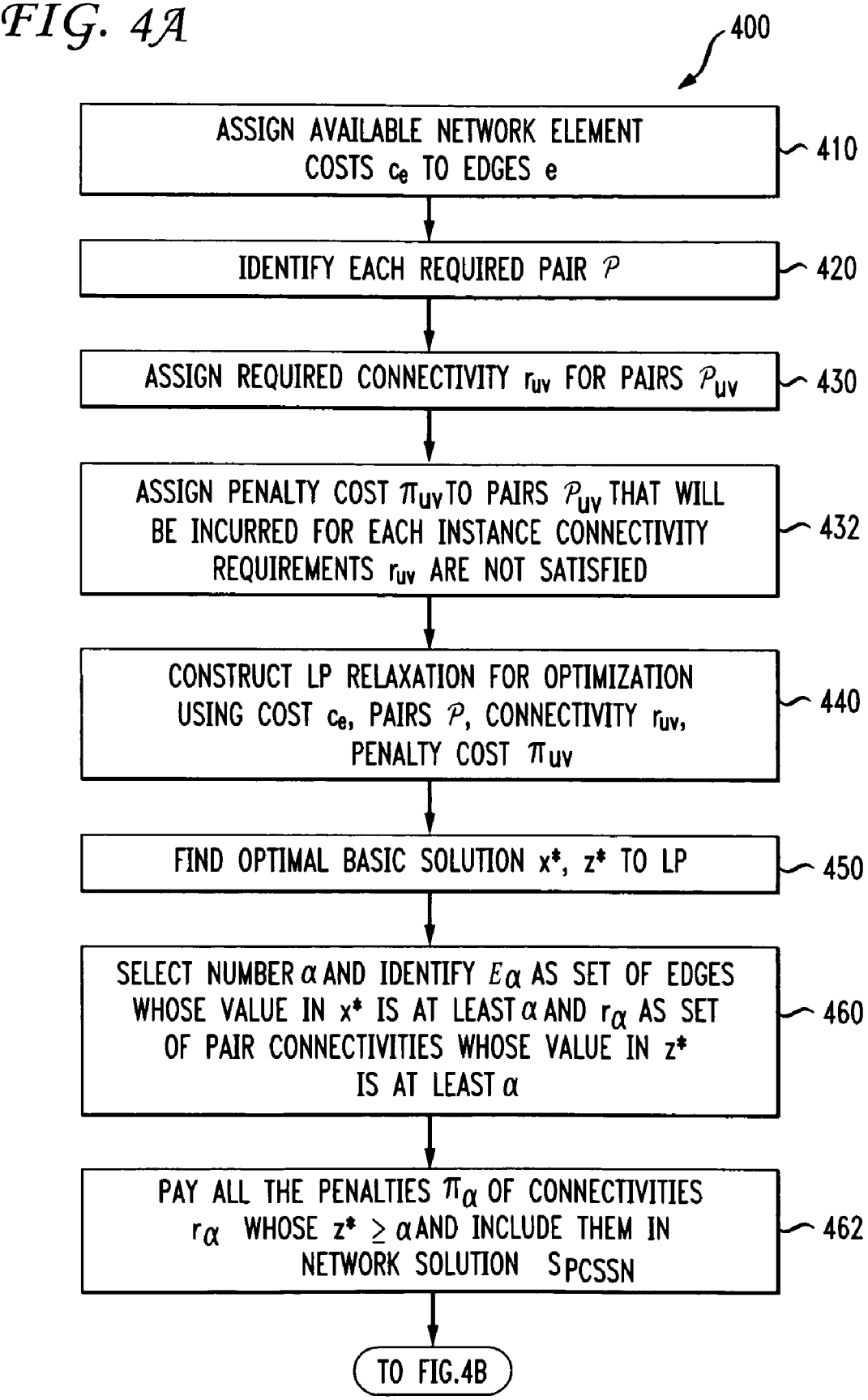
FIGS. 4A and 4B are a flowchart of a second method for designing a network according to the invention.
Figure 4B:
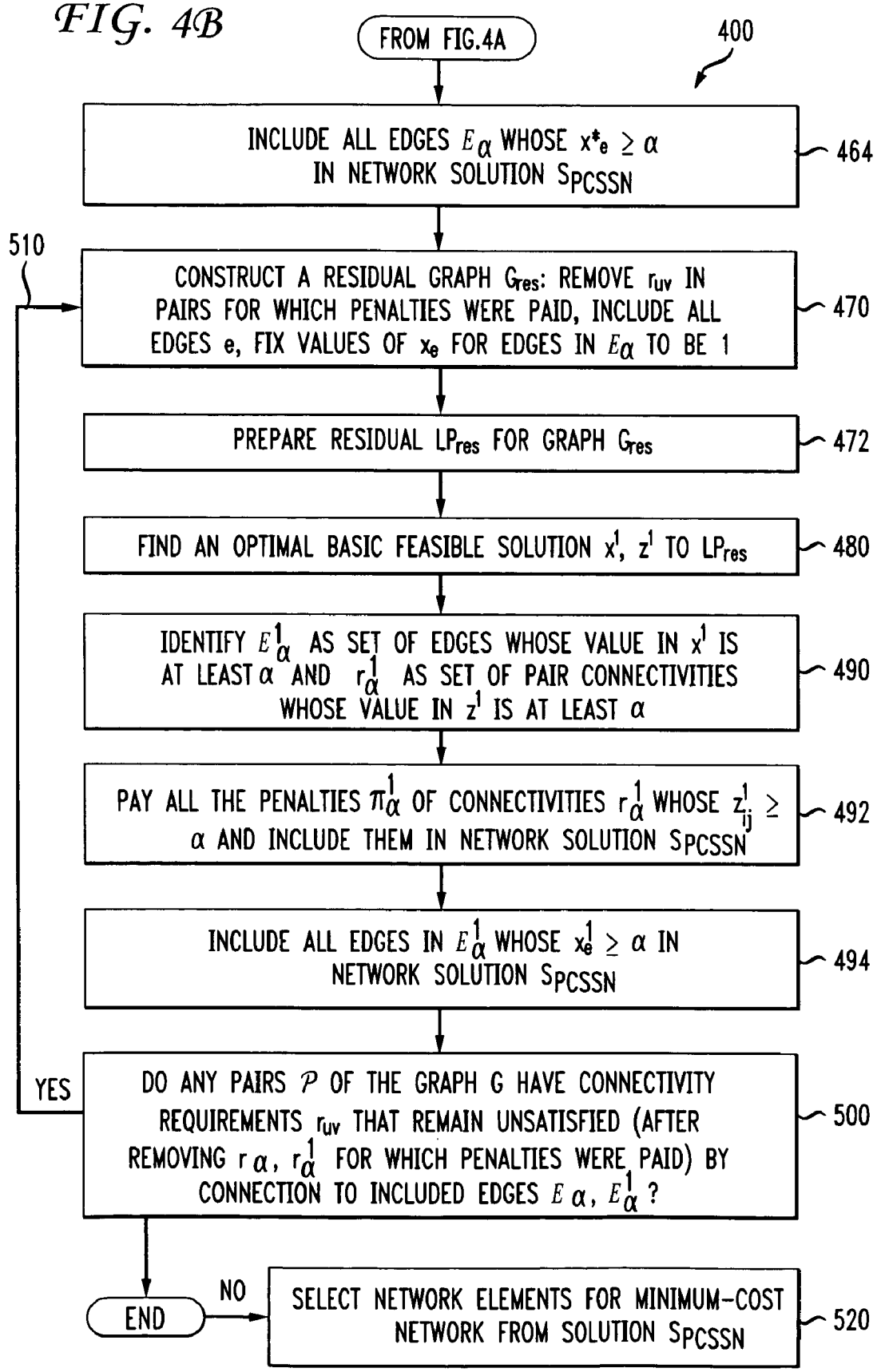

In method 400, illustrated in FIGS. 4A and 4B, the algorithm of method 100 is extended to find a 3-approximation solution to PCSSN. Method 400 finds a solution to a PCSSN whose variables correspond to the costs, required pairs of locations, connectivity requirements and penalties of components of a physical network to be designed.

As discussed above, the network is to include elements selected from a number of possible elements corresponding to graph edges, each of which has a cost. In a fiber optic network design, for example, the elements will be point-to-point routes (e.g., city to city) and their costs may be construction costs such as those that may be encountered in installing fiber optic cable between city A and city B. In step 410, the method 400 assigns these potential network elements costs $c_e$ to edges e.

Also as discussed above, the network solution is required to include certain pairs, which correspond to graph vertices. In a fiber optic network design, for example, the pairs may represent pairs of cities (New York and Washington, New York and Philadelphia, Philadelphia and Richmond, etc,) that are required to be included in any solution. In step 420, the method identifies each of these required pairs $\mathcal{P}_{ij}$ of vertices $v_i, v_j$.

Additionally as discussed above the network solution has connectivity requirements $r_{uv}$ for the vertices u, v of a pair $\mathcal{P}_{uv}$. In step 430, the method assigns connectivity requirements $r_{uv}$ for each of the pairs $\mathcal{P}_{uv}$. In a fiber optic network design, for example, the connectivity requirements may be that a pair of cities shall have k independent (or edge disjoint) multiple paths connecting them to protect against loss of service in the event of element failure.

In step 432, the method assigns non-increasing marginal penalty costs $\pi_{uv}$ to the pairs $\mathcal{P}_{uv}$ that will be incurred if the resulting network does not have the required connectivity $r_{uv}$ for the pairs. The marginal penalty cost will be assessed for each connectivity violation; thus if the connectivity requirement is for 3 independent connections, and the network provides only one, then two penalty costs will be incurred. In a fiber optic network design, for example, each penalty cost may represent the cost of leasing one transmission link from a competing carrier in order to provide one of the required connectivities between the two cities of the pair.

In step 440, the method constructs a natural LP for the optimization problem. In this problem, we are given connectivity requirements $r_{uv}$ for all pairs of vertices u and v and a non-increasing marginal penalty function $\pi_{uv}(.)$ for u and v. Our goal is to find a minimum way of constructing a graph in which we connect u and v with $r'_{uv} \leq r_{uv}$ edge-disjoint paths and pay the marginal penalty $\pi_{uv}(r'_{uv}+1) + \pi_{uv}(r'_{uv}+2) + \ldots + \pi_{uv}(r_{uv})$ for violating the connectivity between u and v to the amount of $r_{uv} - r'_{uv}$. The LP relaxation for the PCSSN problem which can be solved using the Ellipsoid algorithm is as follows:

$$OPT = \text{minimize} \sum_{e \in E} c_e x_e + \sum_{i,j \in P} \sum_{k=1}^{r_{ij}} \pi_{ij}(k) z_{ij}^k$$

subject to $$\sum_{e \in \partial(S)} x_e + \sum_{k=1}^{r_{ij}} z_{ij}^k \geq r_{ij} \quad \forall S \subset V, (i,j) \in P, S \otimes (i,j) 0$$

$$x_e \geq 0 \quad \forall e \in E$$

$$z_{ij}^k \geq 0 \quad \forall (i,j) \in P, 0 \leq k \leq r_{ij}$$

The LP relaxation written as the cut-based LP set forth above alternatively may be written as a standard flow-based LP in which case one would use LP-solver algorithms for a polynomial number of variables and constraints. The choice of which form of LP to use will depend on practical considerations, such as which form is easier to solve.

In the LP above, it is easy to see that because $\pi_{uv}$'s are non-increasing, without loss of generality we can assume $$0 < z_{uv}^k \text{ only if } z_{uv}^{k+1} = 1 \text{ for } 1 \leq k < r_{uv}$$

Thus an algorithm similar to that used in method 100 can be used.

Referring again to FIG. 4A, the method proceeds in step 450 by finding an optimal basic solution x*, z* to the LP of step 440 by using an LP-solver such as the CPLEX® solver described above.

Using the optimal basic solution x*, z* to the LP of step 440, in step 460 the method then selects a number $\alpha$ as a threshold, $0 < \alpha \leq 1$, and then identifies $E_\alpha$ as the set of edges whose value in x* is at least $\alpha$ and identifies $r_\alpha$ as the set of pair connectivities $r_{uv}$ whose value in z* is at least $\alpha$. It can be shown that when $\alpha = \frac{1}{3}$, an iterative rounding algorithm in accordance with the further steps of method 400 will produce a minimum-cost 3-approximation algorithm solution. Accordingly, it is advantageous to select $\alpha = \frac{1}{3}$.

Next in step 462, for the set $r_\alpha$ we pay all the connectivity penalties $\pi_{uv}$ for those $r_{uv}$ whose $z^*_{ij} \geq \alpha$ and include these penalties in a minimum-cost network final solution $S_{PCSSN}$. (It will be understood that when we say we "pay" the penalties, we do not actually pay the penalty at this design stage of a network but signify that we choose to pay the penalty when the network is realized. For convenience, however, we shall refer to payment of a penalty as including designating a certain penalty to be paid later.) We may now remove these paid connectivity requirements $r_{uv}$ in pairs $\mathcal{P}$ from further consideration in the succeeding steps of method 400 to select other network elements for the solution.

In step 464 for the set $E_\alpha$ we select all edges e whose $X^*_e \geq \alpha$ and include them in the minimum-cost network final solution $S_{PCSSN}$.

Figure 2:
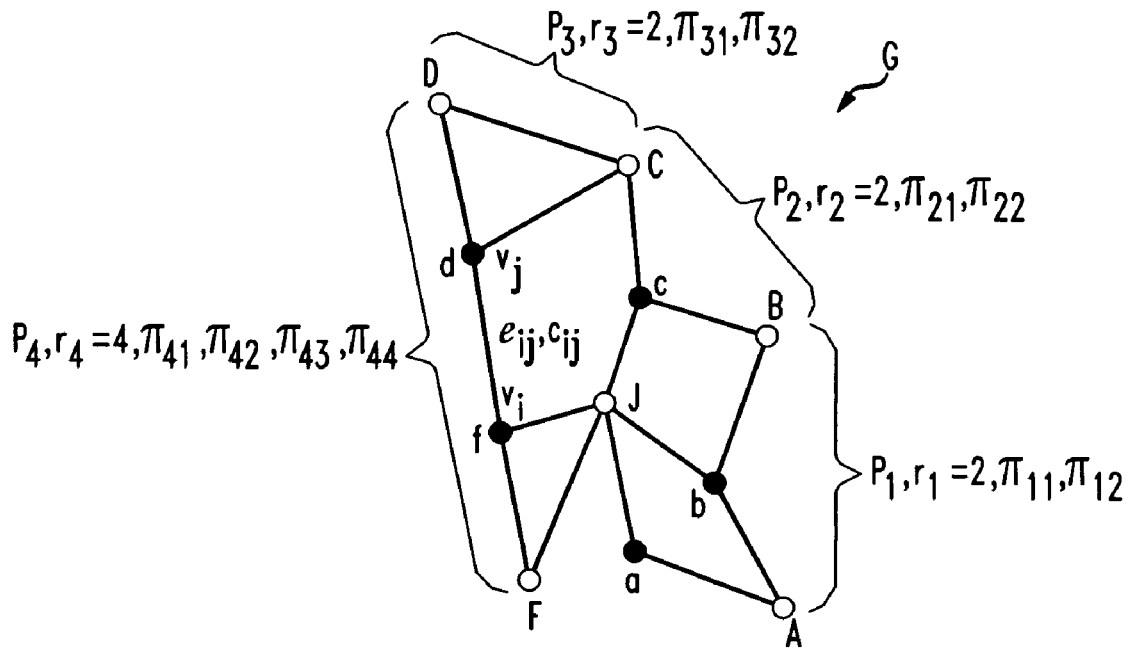
FIG. 2 is a network graph of a type corresponding to a PCSSN.
Figure 2A:
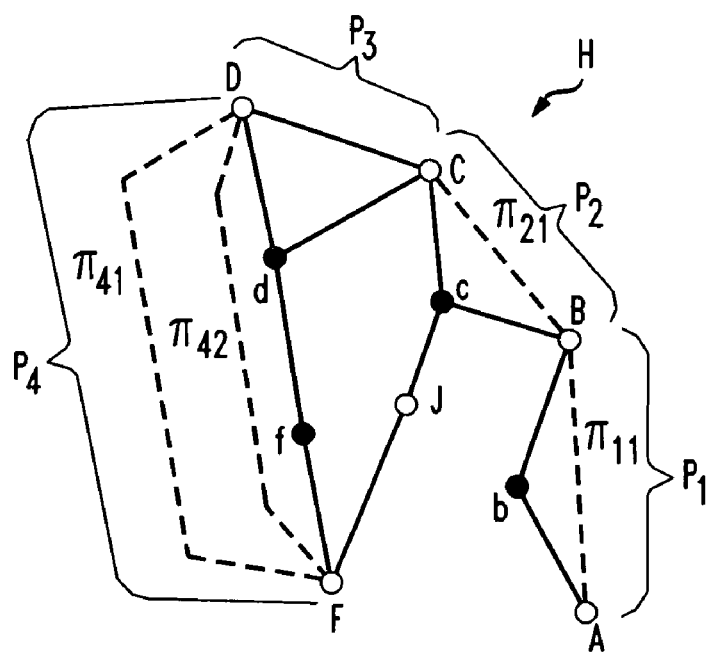
FIG. 2A shows a minimum-cost solution of the network graph of FIG. 2, of a type which may be found using an iterative rounding method according to the invention.
Figure 2B:
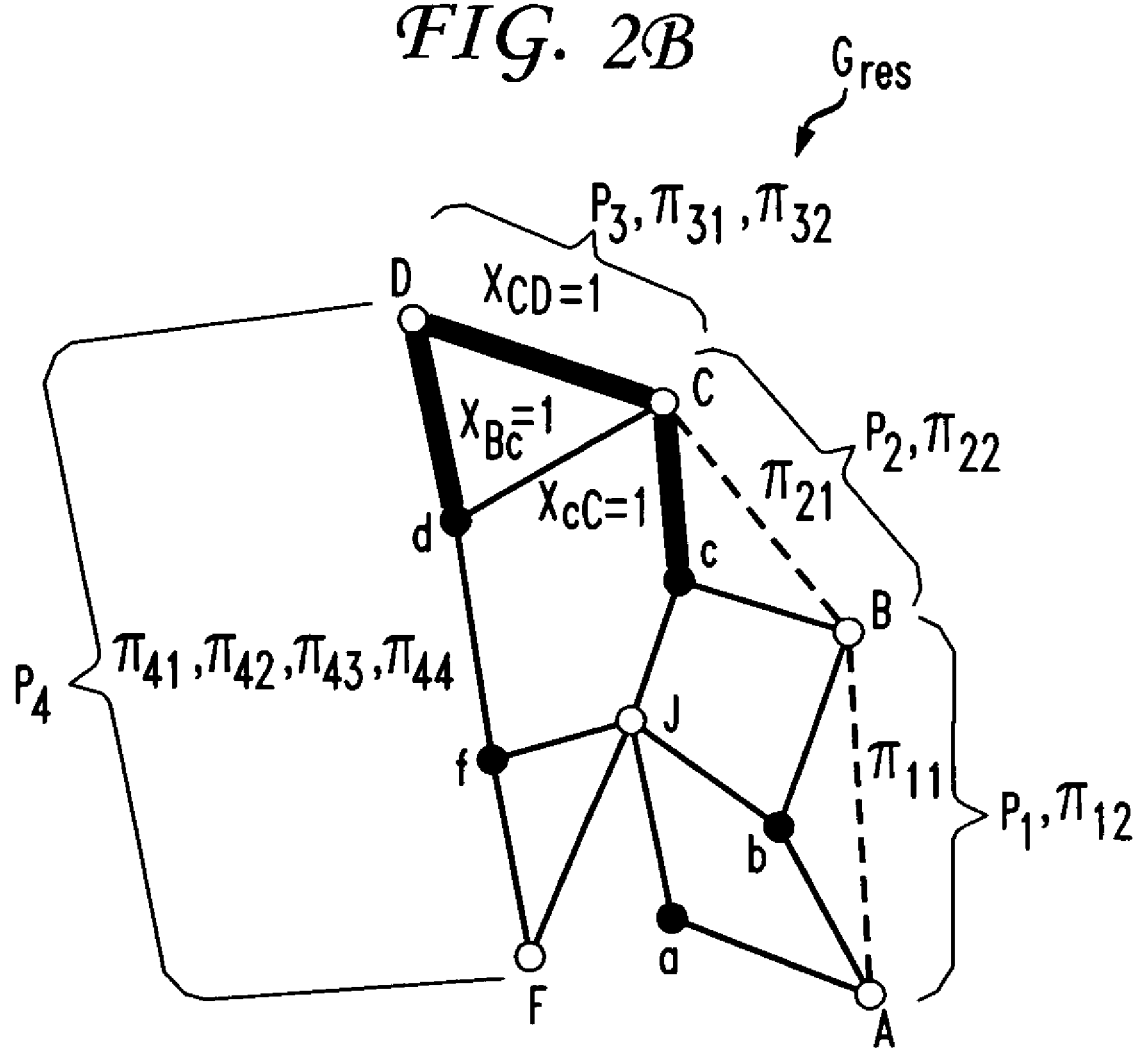
FIG. 2B shows a residual graph used by an iterative rounding method according to the invention to find the minimum-cost solution of FIG. 2A.

In step 470 the method 400 forms another graph $G_{res}$ as follows: (1) we remove any connectivity requirements $r_{uv}$ in pairs for which we paid a penalty in step 462, but retain the remaining connectivity requirements in any pairs which have not had all their connectivity requirements satisfied; (2) we include all edges in E, including the edges $E_\alpha$; (3) however, we fix all values of $x_e$ of edges in $E_\alpha$ to be 1. FIG. 2B shows an example of a graph $G_{res}$ for the graph of FIG. 2, where $\mathcal{P}_1$ and $\mathcal{P}_2$ have had penalties $\pi_{11}$ and $\pi_{21}$ paid and have possible connectivity penalties $\pi_{12}$ and $\pi_{22}$ remaining, $\mathcal{P}_3$ and $\mathcal{P}_4$ have all their possible connectivity penalties remaining, and edges CD, Dd and cC, shown by heavy lines, have been selected. We show $x_{CD}$, $x_{Dd}$ and $x_{cC}$ all equal to 1 but the $x_e$ for the remaining edges remain as variables.

In step 472 we then prepare a residual LP for graph $G_{res}$, referred to as $LP_{res}$, with a new $OPT_{res}$ as follows, where we define $E_{res} = E - E_\alpha$, and $\mathcal{P}_{res}$ as the pairs with remaining $r_{uv} - r_\alpha$ connectivity requirements that have not been paid.

$$OPT_{res} = \text{minimize} \sum_{e \in E} c_e x_e + \sum_{i,j \in P_{res}} \sum_{k=1}^{r_{ij}} \pi_{ij}(k) z_{ij}^k$$

subject to $$\sum_{e \in \partial(S)} x_e + \sum_{k=1}^{r_{ij}} z_{ij}^k \geq r_{ij} \quad \forall S \subset V, (i,j) \in P_{res},$$

$$S \otimes (i,j), \partial(S) \cap E_\alpha = 0$$

$$x_e \geq 0 \quad \forall e \in E_{res}$$

$$z_{ij}^k \geq 0 \quad \forall (i,j) \in P_{res}, 0 \leq k \leq r_{ij}$$

$$x_e = 1 \quad \forall e \in E_\alpha$$

Note in $LP_{res}$ that by including all edges in $E_\alpha$ with $x^*_e \geq \alpha$ and ignoring connectivity requirements $r_{uv}$ with paid penalties in the pairs $\mathcal{P}$ we can always produce another LP similar in form to that for OPT in step 440. Indeed, OPT and $OPT_{res}$ are identical except for their constraints, which reflect optimization in $OPT_{res}$ over a subset of original graph G. (If LP were written as a flow-based LP, the new $LP_{res}$ would be similar in form to that LP.)

Next, in step 480, the method finds an optimal basic feasible solution $x^1$, $z^1$ to $LP_{res}$ with an LP-solver such as the CPLEX® solver described above.

Using the optimal basic feasible solution $x^1$, $z^1$ to $LP_{res}$ found in step 480, in step 490 the method identifies $E_\alpha^1$ as the set of edges whose value in $x^1$ is at least $\alpha$ and identifies $r_\alpha^1$ as the set of pair connectivities whose value in $z^1$ is at least $\alpha$, in the manner described above in step 460.

In step 492 for the pair connectivities $r_\alpha^1$ we pay all the penalties $\pi_{ij}$ of pairs (i,j) whose $z^1_{ij} \geq \alpha$ and include these penalties in the minimum-cost network final solution $S_{PCSSN}$.

In addition, in step 494 for the edges $E_\alpha^1$ we include all edges e whose $x^1_e \geq \alpha$ in the minimum-cost network final solution $S_{PCSSN}$.

In step 500 we determine if there are any remaining connectivity requirements $r_{uv}$ in pairs $\mathcal{P}$ of the graph G, after removing connectivity requirements $r_\alpha + r_\alpha^1$ for which penalties have been paid, that remain unsatisfied by the included edges $E_\alpha + E_\alpha^1$. If yes, the method returns back to step 470 via path 510 to form a new $G_{res}^1$ with a $LP_{res}^1$ in which we define $E_{res}^1 = E - E_\alpha - E_\alpha^1$ and we define $PG_{res}^1$ as the pairs with remaining $r_{uv} - r_\alpha r_\alpha^1$ connectivity requirements that have not been paid, we fix all values of $x_e$ of edges in $E_\alpha$ and $E_\alpha^1$ to be 1 and then we loop iteratively through steps 480 through 500 until no original required connectivities of the graph G remain unsatisfied by connections with selected edges or penalty payments. If it is determined that no unsatisfied pair connectivities of the graph G remain, the iteration stops and the minimum cost network solution $S_{PCSSN}$ to OPT is obtained as the union of the penalties $\pi_{ij}$ paid for pair connectivities $r_\alpha$, $r_\alpha^1$, ... and the selected edges $E_\alpha$, $E_\alpha^1$, ... which were included in solution $S_{PCSSN}$. FIG. 2A shows such a minimum cost network obtained as a result of the iterative rounding steps of method 400 through successive versions of $G_{res}$, one of which is shown in FIG. 2B. The cost of the network is then the sum of the penalties $\pi_{ij}$ paid for pair connectivities $r_\alpha$, $r_\alpha^1$, ... and the edge costs $c_{ij}$ for the selected edges $E_\alpha$, $E_\alpha^1$, ....

Then, in step 520, selected edges and penalty alternatives in the solution $S_{PCSSN}$ from step 500 are used to select network elements for the minimum cost physical network that method 400 is used to design. The selected network elements may include all the elements identified by method 400, or may choose only a subset of those elements if other design requirements are present. In the fiber optic example given previously, these network elements will be the fiber optic links that provide connections between cities, and the penalty alternatives will be the lease costs of providing service through other providers to pairs of cities unconnected with the required connectivity by the selected fiber optic links.

It will be apparent to those of skill in the art that the method 400 becomes the same as method 100 if the connectivity requirements $r_{uv}$ for pairs are all 1. However, method 400 will permit solutions to more complex problems where at least some of the connectivity requirements are greater than 1.

The steps of method 400 described above may be embodied in routines in a computer program, capable of being operated by a standard computer system such as the one shown in FIG. 6 and described below.

Figure 5:
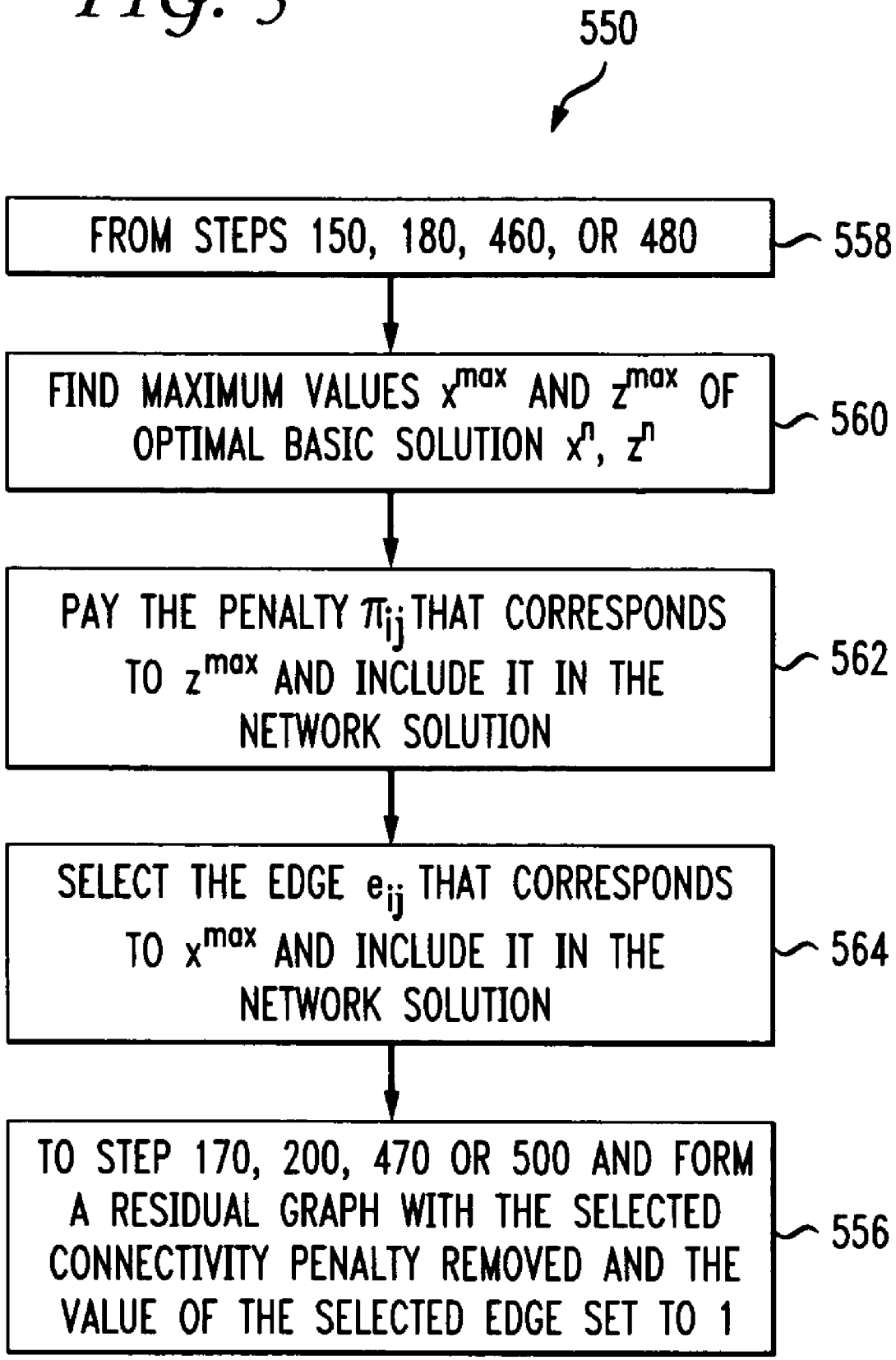
FIG. 5 is a flowchart of a modified method for designing a network according to the invention.

FIG. 5 is a flowchart showing a modified method 550 that may be used in methods 100 and 400 as a substitute for steps 160 through 164, 190 through 194, 460 through 464, and 490 through 494. Briefly, in method 550, instead of selecting a threshold number a and including all penalties and edges in the solution that have coefficients x and $z \geq \alpha$, method 550 proceeds by selecting in each iteration only the penalty and edge with the maximum coefficient x and z. Thus, in step 558 the optimal basic solution $x^n$, $z^n$ to an LP is received from steps 150, 180, 460 or 480, and in step 560 the maximum values of the coefficients $x^{max}$ and $z^{max}$ in the optimal solution are found. In step 562 the penalty $\pi_{ij}$ whose pair connectivity requirement corresponds to $z^{max}$ is paid and included in the network solution. In step 564 the edge $e_{ij}$ corresponding to $x^{max}$ is selected and included in the network solution. In step 556 method 550 then connects to step 170, 200, 470 or 500 in methods 100 and 400 to proceed as discussed to form a residual graph with the connectivity penalty removed and the value of the selected edge set to 1 and to determine if any connectivity requirements remain unsatisfied. Methods 100 and 400 incorporating method 550 by select only one element per iteration, rather than all which exceed a threshold a, will require longer to perform but will have a greater likelihood of producing a near-optimal solution.

Figure 6:
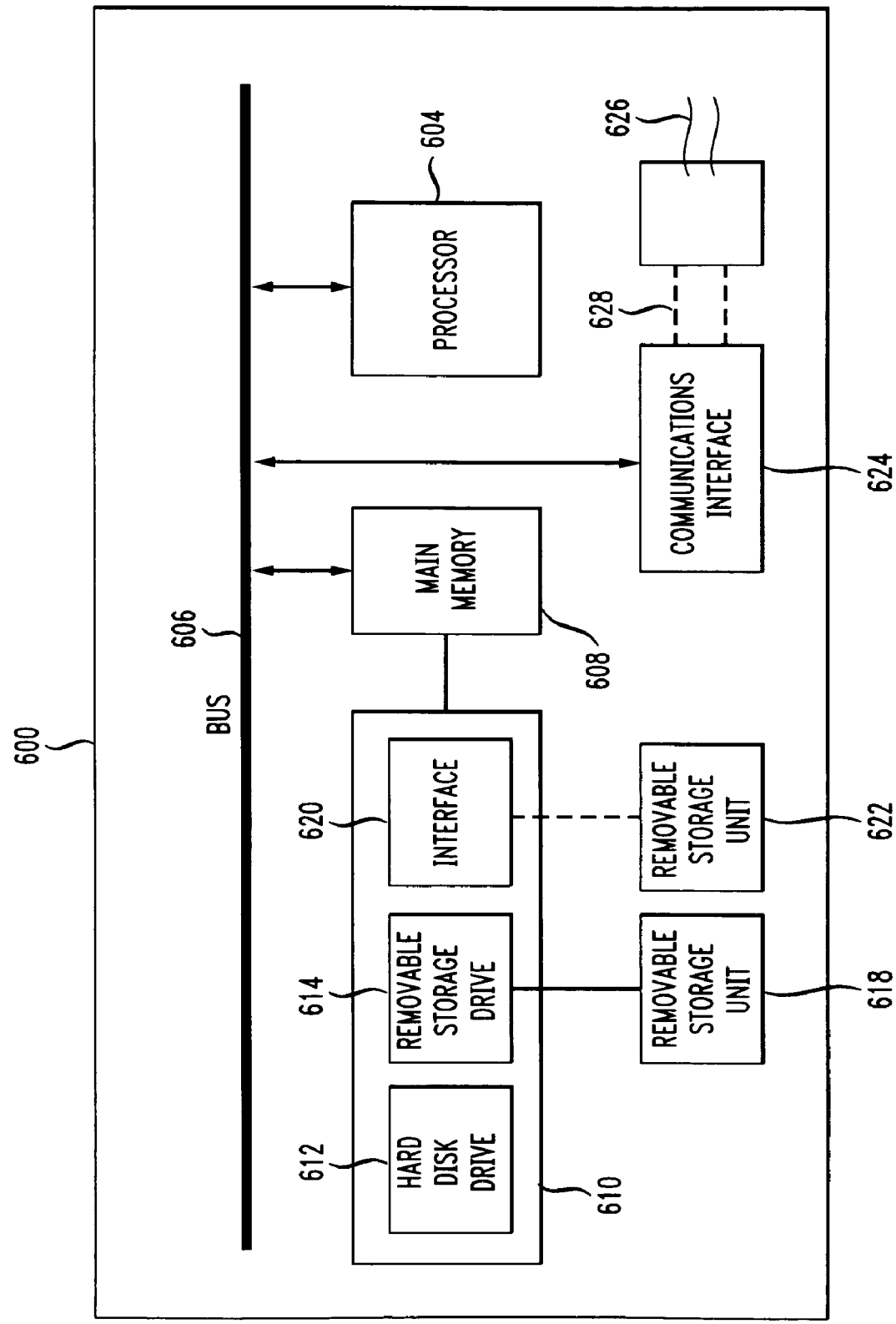
FIG. 6 is a diagram of a computer system to operate a computer readable program means that performs the steps in the methods of the present invention.

FIG. 6 is a block diagram illustrating a computer system 600 configured to utilize iterative rounding to find an approximate solution to the PCSF and PCSSN network design methodologies, in accordance with the exemplary embodiments described above. Such a computer system 600 may be utilized to implement the calculation methods described above in regard to FIGS. 3A, 3B, 4a and 4B. Thus the present invention, in another aspect, includes one or more computer systems capable of carrying out the methods of the invention; in a further aspect, the present invention is directed to a computer-usable program code storage medium to cause a computer to perform the methods of the invention. After reading this description, it will become apparent to a person skilled in the relevant art how to implement the invention using other computer systems and/or computer architectures.

The computer system 600 shown in FIG. 6 includes one or more processors, such as processor 604. The processor 604 is connected to a communication bus 606. Computer system 600 also includes a main memory 608, preferably random access memory (RAM), and can also include a secondary memory 610. The secondary memory 610 can include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618 represents a floppy disk, magnetic tape, optical disk, or similar device which is read by and written to by removable storage drive 614. As will be appreciated, the removable storage unit 618 includes a computer usable storage medium for storing computer software and/or data.

In alternative embodiments, secondary memory 610 may include other similar means for allowing computer programs or other instructions to be loaded into computer system 600. Such means can include, for example, a removable storage unit 622 and an interface 620. Examples of such include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 618 to computer system 600.

Computer system 600 can also include a communications interface 624. Communications interface 624 allows software and data to be transferred between computer system 600 and external devices, such as an ISP network. Examples of communications interface 624 can include a modem, a network interface (such as an Ethernet card), a communications port, a PCMCIA slot and card, etc. Software and data transferred via communications interface 624 are in the form of signals which can be electronic, electromagnetic, optical or other signals capable of being received by communications interface 624. These signals 626 are provided to communications interface 624 via a channel 628. This channel 628 carries signals 626 and can be implemented using wire or cable, fiber optics, a phone line, a cellular phone link, an RF link and other communications channels.

In this specification, the terms "computer program medium" and "computer usable medium" are used to generally refer to media such as removable storage device 618, a hard disk installed in hard disk drive 612, and signals 626. These computer program products are means for providing software to computer system 600.

Computer programs (also called computer control logic) are stored in main memory 608 and/or secondary memory 610. Computer programs can also be received via communications interface 624. Such computer programs, when executed, enable the computer system 600 to perform the features of methods 100 and 400 of the present invention as discussed herein. In particular, the computer programs, when executed, enable the processor 604 to perform the features of the present invention. Accordingly, such computer programs represent controllers of the computer system 600.

In an embodiment where the invention is implemented using software, the software may be stored in a computer program product and loaded into computer system 600 using removable storage drive 614, hard drive 612 or communications interface 624. The control logic (software), when executed by the processor 604, causes the processor 604 to perform the methods of the invention as described above.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). It will be apparent that the invention may be implemented using a combination of both hardware and software.

Thus, the invention describes methods with an iterative rounding feature enabling networks to be designed with constraints that correspond to the PCSF and PCSSN. The feature includes both method aspects and system aspects. While the present invention has been described with reference to preferred and exemplary embodiments, it will be understood by those of ordinary skill in the art that various changes may be made and equivalents may be substituted for elements thereof without departing from the scope of the invention. In addition, many modifications may be made to adapt a particular situation to the teachings of the invention without departing from the scope thereof. Therefore, it is intended that the invention not be limited to the particular embodiments disclosed, but that the invention include all embodiments falling within the scope of the appended claims.

APPENDIX

Proof of a 3-Approximation Solution

LP 1 Refers to the LP in Paragraph 42 of the Description; LP 6 Refers to the LP in Paragraph 50 of the Description Theorem 1 It any basic feasible solution for LP 1, for at least one edge e ∈ E, $$x_e >= \frac{1}{3},$$

or for at least one pair (i, j) ∈ P, $$z_{ij} >= \frac{1}{3}.$$

Theorem 2 If $x^1$, $z^1$ is an integral solution, to the LP 6 with value at most $$\frac{1}{\alpha} OPT_{res},$$

then $E_{x_e=1} \cup E_{60}$, $P_{zij=1}{}^{\cup P}{}_\alpha$ is feasible solution for LP 1 with value at most $$\frac{1}{\alpha} OPT.$$

Proof: The feasibility is clear from the definitions. In order to prove the value is at most twice OPT, since the restriction of x*, z* to $E_{res}$ and $P_{res}$ is a feasible solution to LP 6,: $OPT_{res} \geq OPT - \Sigma_{e \in E_\alpha} x_e^* c_e - \Sigma_{(i,j) \in P_\alpha} z_{ij}^* \pi_{ij}$ and thus $$\frac{1}{\alpha} OPT \geq \frac{1}{\alpha} OPT_{res} + \frac{1}{\alpha} \sum_{e \in E_\alpha} x_e^* c_e + \frac{1}{\alpha} \sum_{(i,j) \in P_\alpha} z_{ij}^* \pi_{ij}.$$

Since for $e \in E_\alpha$, $x_e \geq \alpha$ and for $(i, j) \in P_\alpha$, $z_{ij} \geq \alpha$, $$\frac{1}{\alpha} OPT \geq \frac{1}{\alpha} OPT_{res} + \sum_{e \in E_\alpha} c_e + \sum_{(i,j) \in P_\alpha} \pi_{ij}.$$

Since for e ∈

$$\sum_{e \in E} c_e x_e^I + \sum_{i,j \in V} \pi_{ij} z_{ij}^I \leq \frac{1}{\alpha} OPT_{res,}$$

we have $$\frac{1}{\alpha} OPT \geq \sum_{e \in E} c_e x_e^I + \sum_{e \in E_\alpha} c_e + \sum_{i,j \in V} \pi_{ij} z_{ij}^I + \sum_{(i,j) \in P_\alpha} \pi_{ij}.$$

This finishes the proof.

By combining Theorems 1 and 2 we obtain the following conclusion:

Corollary 3 There is an iterative rounding 3-approximation algorithm for PCSF.

Proof of Theorem 1

In this section, we prove Theorem 1. Let x, z be a basic feasible solution. If for an edge e, $x_e=1$ or for a pair $(i^1, j^1)$, $z_{ij}=1$, then the theorem follows. Also, if for an edge e, $x_e=0$, then we can assume that the edge was never there before. This assumption does not increase the cost of the optimum fractional solution $x_e$. Thus we can assume that $0 < x_e < 1$ and $0 \leq z_e < 1$ for all e ∈ E and (i,j) ∈ 𝒫.

Let 𝓜(S, ii') be the row of the constraint matrix corresponding to a set S ⊂ V and pair (i,i') ∈ 𝒫 Let x(A, B) be the guru of all $x_e$'s, where e has one end in A and the other end in B. We represent x(A, A) by x(A), for ease of notation. We say a set A is tight with pair (i, i') if A ⊙ (i, i') and $x(A)+z_{ij}=1$.

Theorem 4 If A is tight with (i, i') and B is tight with (j, j') then at least one of the following holds:
1. A−B is tight with (i, i'), B−A is tight with (j, j') and 𝓜(A, ii')+𝓜(B, jj')=𝓜(A−B, ii')+𝓜(B−A, jj').
2. A−B is tight with (j, j'), B−A is tight with (i, i') and 𝓜(A, ii')+𝓜(B, jj')=𝓜(A−B, jj')+𝓜(B−A, ii').
3. A ∩ B is tight with (i, i') A ∪ B is tight with (j, j') and 𝓜(A, ii')+𝓜(B, jj')=𝓜(A ∩ B, ii')+𝓜(A ∪ B, jj').
4. A ∩ B is tight with (j, j'), A ∪ B is tight with (i, i') and 𝓜(A, ii')+𝓜(B, jj')=𝓜(A ∩ B, jj')+𝓜(A ∪ B, ii').
5. A−B is tight with (i, i'), B−A is tight with (i', i), A ∩ B is tight with (j, j') A ∪ B is tight with (j, j') and 2𝓜(A, ii')+2𝓜(B, jj')=𝓜(A−B, ii')+𝓜(B−A, ii') +𝓜(A ∩ B, jj')+𝓜(A ∪ B, jj').

Proof: The proof is by case analysis. For the ease of notaion, if a set A is tight with pair (i, i'), we assume i ∈ A (and thus i' ∉ A).

We consider two cases: i ∈ A−B and i ∈ A ∩ B. Without loss of generality, we assume in the latter case j ∈ A ∩ B also (otherwise we consider j instead of i in our arguments). Because of tightness we have:

$x(A)=x(A-B, B-A)+x(A-B, \overline{A \cup B})+x(A \cap B, B-A)+ x(A \cap B, \overline{A \cup B})=1-z_{ii'}$ $x(B)=x(B-A, A-B)+x(B-A, \overline{A \cup B})+x(A \cap B, A-B)+ x(A \cap B, \overline{A \cup B})=1-z_{jj'}$ Let's first start with the case in which i ∈ A ∩ B (and thus j ∈ A ∩ B). In this case i' ∈ $\overline{A \cup B}$ and j' ∈ $\overline{A \cup B}$. Because of the feasibility:

$x(A \cap B)=x(A \cap B, A-B)+x(A \cap B, B-A)+ x(A \cap B, \overline{A \cup B}) \geq 1-z_{ii'}$ $x(A \cup B)=x(A-B, \overline{A \cup B})+x(A \cap B, \overline{A \cup B})+ x(B-A, \overline{A \cup B}) \geq 1-z_{jj'}$ Since x(.,.)≥0, by summing up the two inequalities above and using the equalities for x(A) and x(B), we conclude that the inequalities should be tight, i.e. x(A ∩ B)=1−$z_{ii'}$ and x(A ∪ B)=1−$z_{jj'}$ and in addition x(A−B, B−A)=0, i.e., 𝓜(A, ii')+𝓜(B, jj')=𝓜(A ∩ B, ii')+𝓜(A ∪ B, jj'). Thus we are in the case 3 of the statement of the theorem.

Now assume that i ∈ A−B and j ∈ B−A.

Then independent of the place of i', j', by the feasibility of the solution we have:

$$x(A-B)=x(A-B, A \cap B)+x(A-B, B-A)+x(A-B, \overline{A \cup B}) \geq 1-z_{ii'}$$

$$x(B-A)=x(B-A, A-B)+x(B-A, A \cap B)+x(B-A, \overline{A \cup B}) \geq 2-z_{jj'}$$

Since $x(.,.) \geq 0$, by summing up the two inequalities above and using the equalities for $x(A)$ and $x(B)$, we conclude that the inequalities should be tight, i.e., $x(A-B)=1-z_{ii'}$, and $x(B-A)=1-z_{jj'}$, and in addition $x(A \cap B, \overline{A \cup B})=0$, i.e. $\mathcal{M}(A, ii')+\mathcal{M}(B, jj')=\mathcal{M}(A-B, ii')+\mathcal{M}(B-A, jj')$. Thus we are in the case 1 of the statement of the theorem.

Finally we consider the case in which $i \in A-B$ and $j \in A \cap B$ (and thus $j \in A \cup B$).

Now if i' $\in A \cup B$, then by the feasibility of the solution we have:

$$x(A \cap B)=x(A \cap B, A-B)+x(A \cap B, B-A)+x(A \cap B, \overline{A \cup B}) \geq 1-z_{jj'}$$

$$x(A \cup B)=x(A-B, \overline{A \cup B})+x(A \cap B, \overline{A \cup B})+x(B-A, \overline{A \cup B}) \geq 1-z_{ii'}$$

Since $x(.,.) \geq 0$, by summing up the two inequalities above and using the equalities for $x(A)$ and $x(B)$, we conclude that the inequalities: should be tight, i.e., $x(A \cap B)=1-z_{jj'}$, and $x(A \cup B)=1-z_{ii'}$, and in addition $x(A-B, B-A)=0$, i.e., $\mathcal{M}(A, ii')+\mathcal{M}(B, jj')=\mathcal{M}(A \cap B, jj')+\mathcal{M}(A \cup B, ii')$. Thus we are in the case 4 of the statement of the theorem.

Finally if i' $\in B-A$ then, because of feasibility we have $$x(A-B)=x(A-B, A \cap B)+x(A-B, B-A)+x(A-B, \overline{A \cup B}) \geq 1-z_{ii'}$$

$$x(A \cap B)=x(A \cap B, A-B)+x(A \cap B, B-A)+x(A \cap B, \overline{A \cup B}) \geq 1-z_{jj'}$$

$$x(B-A)+x(B-A, A-B)+x(B-A, A \cap B)+x(B-A, \overline{A \cup B}) \geq 1-z_{jj'}$$

$$x(A \cap B)=x(A-B, \overline{A \cup B})+x(A \cap B, \overline{A \cup B})+x(B-A, \overline{A \cup B}) \geq 1-z_{ii'}$$

Since $x(.,.) \geq 0$, by summing up the four inequalities above and and use the equalities for $2x(A)$ and $2x(B)$, we conclude that all inequalities should be tight, and in addition $x(A-B, B-A)=0$ and $x(A \cap B, \overline{A \cup B})=0$, i.e., and $2\mathcal{M}(A, ii')+2\mathcal{M}(B, jj')=\mathcal{M}(A-B, ii')+\mathcal{M}(B-A, jj')+\mathcal{M}(A \cap B, ii')+\mathcal{M}(A \cup B, jj')$. So the case 5 of the statement of the theorem holds.

Note that especially Case 5 in Theorem 4 is novel to our extension of iterative rounding methods.

Let $\mathcal{T}$ be the set of all tight constraints. For any set of tight constraints $\mathcal{F}$, we denote the vector space spanned by the vectors $\mathcal{M}(S, ii')$, where $S \subset V$ and $(i, i') \in \mathcal{P}$, by Span $\mathcal{F}$, We say two sets A and B cross if none of the sets A−B, B−A and A ∩ B is empty. We say a family of tight constraints is laminar if no two sets corresponding to two constraints in it cross.

Theorem 5 For any maximal laminar family $\mathcal{L}$ of tight constraints, Span($\mathcal{L}$)=Span$\mathcal{T}$).

Proof: Since $\mathcal{L} \subset \mathcal{T}$, Span($\mathcal{L}$) $\subset$ Span($\mathcal{T}$). If Span($\mathcal{T}$) $\subset$ Span($\mathcal{L}$), then there exists a set A tight with (i, i'), in $\mathcal{T}$ such that $\mathcal{M}(A, ii') \notin$ Span($\mathcal{L}$). We choose a set A which crosses the minimum number of sets in $\mathcal{L}$. Since $\mathcal{M}(A, ii') \notin$ Span($\mathcal{L}$), $\mathcal{M}(A, ii') \notin \mathcal{L}$ From the maximality of $\mathcal{L}$, A must cross some set B tight with (j, j') in $\mathcal{L}$ From Theorem 4, one of the following must hold:

1. A−B is tight with (i, i'), B−A is tight with (j, j') and $\mathcal{M}(A, ii')=\mathcal{M}(A-B, ii')+\mathcal{M}(B-A, jj')-\mathcal{M}(B, jj')$.
2. A−B is tight with (j, j'), B−A is tight with (i, i') and $\mathcal{M}(A, ii')=\mathcal{M}(A-B, jj')+\mathcal{M}(B-A, ii')-\mathcal{M}(B, jj')$.
3. A ∩ B is tight with (i, i'), A ∪ B is tight with (j, j') and $\mathcal{M}(A, ii')=\mathcal{M}(A \cap B, ii')+\mathcal{M}(A \cup B, jj')-\mathcal{M}(B, jj')$.
4. A ∩ B is tight with (j, j'), A ∪ B is tight with (i, i') and $\mathcal{M}(A, ii')=\mathcal{M}(A \cap B, jj')+\mathcal{M}(A \cup B, ii')-\mathcal{M}(B, jj')$.
5. A−B is tight with (i, i'), B−A is tight with (i', i), A ∩ B is tight with (j, j'), A ∪ B is tight with (j, j') and $\mathcal{M}(A, ii')= \frac{1}{2} \mathcal{M}(A-B, ii')+\mathcal{M}(B-A, ii')+\mathcal{M}(A \cap B, jj')+\mathcal{M}(A \cup B, jj')]-\mathcal{M}(B, jj')$, But this means one of $\mathcal{M}(A-B, ii')$, $\mathcal{M}(A-B, jj')$, $\mathcal{M}(A \cap B, ii')$, $\mathcal{M}(A \cap B, jj')$, $\mathcal{M}(B-A, ii')$, $\mathcal{M}(B-A, jj'$ $\mathcal{M}(A \cup B, ii')$, and $\mathcal{M}(A \cup B, jj')$ does not belong to Span($\mathcal{L}$). Now the rest of the proof is very similar to that of Lemma 04.2 in [12] and thus omitted.

Since x, z is a basic feasible solution, the dimension of Span($\mathcal{T}$) is $|E(G)|+|\mathcal{P}|$. Since Span($\mathcal{L}$)=Span($\mathcal{T}$), it is possible to choose a basis for Span($\mathcal{T}$) from the vectors in $\{M(S, ii)\} \in \mathcal{L}$ Let $\mathcal{B} \subset \mathcal{L}$ forms a basis for Span($\mathcal{T}$). Hence we have the following theorem.

Corollary 6 There exists a laminar family, $\mathcal{B}$ of tight constraints satifying the following.
1. $|\mathcal{B}|=|E(G)|+|\mathcal{P}|$.
2. The vectors in $\mathcal{B}$ are independent.
3. All constraints in $\mathcal{B}$ are tight.

Note that in our laminar family if a set S is tight with both (i, i') and (j, j') in two different constraints, since $z_{ii'}=z_{jj'}$, we can remove variable $z_{jj'}$ and just use $z_{ii'}$ instead. Since we removed one variable and one constraint, still we have a basic feasible solution which is laminar. By this reduction, we always can make sure that each set is tight with only one pair. Thus a tight set uniquely determines the tight pair and we use a tight constraint and a tight set interchangeably in our discussion below.

Now we are ready to prove Theorem 1.

Theorem 7 In any basic feasible solution for LP 1, for at least one, edge $e \in E$, $$x_e \geq \frac{1}{3},$$

or for at least one pair $(i, j) \in P$;

$$z_{ij} \geq \frac{1}{3}.$$

Proof: We are giving a token to each end-point of an edge (and thus two tokens for an edge) and two tokens to all z variables (notice that some z variables are used for more than one commodity pairs as discussed above). Now, we will distribute the tokens such that for every set in the laminar family gets at least two tokens and every root at least four tokens unless the corresponding cut has exactly three edges. (note that each cut has at least three edges since the value of each variable is less than ⅓) in which the root gets at least three token. This contradict the equality $|V(F)|=|E(G)|+|\mathcal{P}|$ where F is the rooted forest of laminar sets in the laminar family. The subtree of F rooted at R consists of R and all its descendants. We will prove this result by the induction on every rooted subtree of F.

Consider a subtree rooted at R. Since all $x_e$ and $z_{ij}$ are at most ⅓, if R is a leaf node, it has at least three edges crossing it and thus gets at least three tokens (and more than 3 tokens if the degree is more than 3). This means the induction is correct for a leaf node, as the basis of the induction.

If R has four or more children, by the induction hypothesis each child has at least three tokens and each of their descendants gets at least two tokens. We re-assign one extra token from each child to the node R. Thus R has at least four tokens and the induction hypothesis is correct in this case.

If R has three children, if there is a private vertex u to R, i.e., a vertex which is in R but not in any of its children, then we are done (since all $x_e$ values are fractional, the degree of u is at least two and thus can contributes at least two extra tokens toward R). Also if one of the children has at least four edges in its corresponding cut, but the induction hypothesis it has at least two extra tokens to contribute toward those of R and we are done. Finally, if R has exactly three children each with exactly three edges in its corresponding cut, then by parity R has an odd number of edges in its corresponding cut. If R has edges in the its cut then the three extra token by its children suffices. If R has seven or nine edges in the cut, then at least one of its children has all three edges in the cut and the corresponding pair is not satisfied. But this means all other edges than those of this cut should be zero which is contradiction to fractional value assumption. Now if R tight with $z_{pp'}$ has exactly five edges in the cut, it should be the case that two children $C_1$ tight with $z_{ii'}$ and $C_3$ tight with $z_{kk'}$ have two edges in the cut and $C_2$ tight with $z_{jj'}$ has one edges in the cut. Note that in this case $z_{pp'} > \min \{z_{ii'}, z_{jj'}, z_{kk'}\}$ then at least for one of $z_{ii'}, z_{jj'}$, and $z_{kk'}$ all pairs should be inside R for the first time and thus we have at least two extra tokens towards the requirement of R and we are done. It also means that p-should be inside the child C with min $\{z_{ii'}, z_{jj'}, z_{kk'}\}$ and it should be equal to its corresponding z value (otherwise child C violates the condition for $z_{pp'}$). Assume that $z_{pp'} = z_{jj'}$. In this case, it is easy to see that since $C_2$ is tight With three edges and with five edges, the sum of x variables of $C_1$ and C3 in the cut R is equal to the sum of x variables of $C_1$ and $C_3$ to $C_2$. But it means at least for one of $C_1$ and $C_3$, the edge e to $C_2$ has $x_e \geq x_{e'} + x_{e''}$ where e' and e'' are the edges in the cut R. But since $$x_e + x_{e'} + x_{e''} > \frac{2}{3}$$

$$\left(\text{due to the fact that all } z \text{ variables are less than } \frac{1}{3}\right),$$

$$x_e \geq \frac{1}{3}$$

which is a contradiction. If $z_{pp'} = z_{ii'} \leq z_{kk'}$ where $z_{ii'} < z_{jj'}$. In this case the edge from $C_1$ to $C_2$ should has an x value equal to that those edges of $C_2$ and $C_3$ in the cut R. It means the total x value of two edge of $C_3$ in the cut is less than $\frac{1}{3}$ which is a contradiction, since the third edge has x value at least $\frac{1}{3}$.

Now in case R tight with $z_{pp'}$ has two children if there is a private vertex u to R we have at least four tokens to satisfy R (two from u and one from each of its children). If both of these children have degree at least four, then we have four extra tokens for R (two from each child). Then at least one of two children, namely $C_1$ tight with $z_{ii'}$ has exactly three edges in its corresponding cut. The other child $C_2$ tight with $z_{jj'}$ has at least three edges in the cut. Note that in this case $z_{pp'} > \min \{z_{ii'}, z_{jj'}\}$ then at least for one of $z_{ii'}$ and $z_{jj'}$, all pairs should be inside R for the first time and thus we have at least two extra tokens towards the requirement of R and we are done. It also means that p should be inside the child C with min $\{z_{ii'}, z_{jj'}, z_{kk'}\}$ and it should be equal to its corresponding z value (otherwise child C violates the condition for $z_{pp'}$). First assume that $z_{pp'} = z_{ii} \leq z_{jj'}$. In this case it is not possible that all three edges of $C_1$ are in the cut R, since then all edges of $C_2$ are in the cut R and they are zero (since the cut R is, already tight with $z_{pp'} = z_{ii'}$). If $C_1$ has two edges in the cut since $z_{ii'} \leq z_{jj'}$, it means sum of the x values of the edges in the cut corresponding to R, which has one edges from $C_1$ and the rest are the edges of $C_2$ in the R cut, should be at least the sum of x values of the cut corresponding to $C_2$. But these means the x value of the edge of $C_1$ in the R cut is at least the sum of x values of the two edges from $C_1$ to $C_2$. Since value of all three edges in $C_1$ is at least $\frac{2}{3}$, it means the x value of the edge, of $C_1$ in the R cut is at least $\frac{1}{3}$, a contradiction. In case $C_1$ does not have any edges in the cut R, then all edges should go $C_2$ which means zii, should be tight with a proper subset of edges of $C_2$ though we know that x values of all edges of $C_2$ is at most $1-z_{jj'}$, a contradiction. we know even all edges of minus those edges should be tight in R with the same $z_{jj'}$ which means all edges between $C_1$ and $C_2$ should be zero which is a contradiction. Next assume that $z_{pp'} = z_{jj'} \leq z_{ii'}$. In this case it is not possible that all edges of $C_2$ and thus $C_1$ are in the cut since all edges of $C_1$ should have zero x value. In case there is one edge of $C_1$, or two edges of $C_1$ are in the cut R, then x value of one edge of $C_1$ is equal to the x value of two edges of $C_1$ which means that edge should have x value at least $\frac{1}{3}$ B which is a contradiction. In case $C_1$ does not have any edges in the cut R, then $C_2$ minus those edges should be tight in R with the same $z_{jj'}$ which means all edges between $C_1$ and, $C_2$ should be zero which is a contradiction.

It only remains the case in which R has only one child C. In this, case if R and C are both tight with respect to $z_{ii'}$, then since R and C are independent there is a vertex $u \in R-C$. However, if R is tight with $z_{ii'}$ and C is tight with $z_{jj'}$ since $z_{ii'} \neq z_{jj'}$, these two cuts should be different and thus again there is vertex $u \in R-C$. Since all $x_e$ values are fractional the degree of u is at least two and thus u gets at least two tokens. Without loss of generality assume u is the node with maximum degree. If it has degree at least three then we can assign at least these three private tokens of u and at least one extra token of C to R to have the induction hypothesis satisfied. In case u has degree two and C has at least four edges in the cut, then we have at least two tokens from u and two extra tokens from C to assign at least four tokens to R and satisfy the hypothesis. The only remaining case is when u has degree two and C has an odd number of edges in its cut. However in this case because of parity, R should has an odd number of edges in its cut (note that in this case, we may have some other vertices than u of degree two in R-C.) It this odd number is three then two tokens of u and one extra token of C satisfies the required number of tokens for R. If there is a vertex other than u in $R_C$ it has also two extra tokens and we are done. The only case is that u has degree two, C has three edges and all these five edges are in the cut corresponding to R. It means in this case R should be tight with $z_{ii'}$ and C should be tight with $z_{jj'}$ where $z_{ii'} < z_{jj'}$ (otherwise the edges from u in the cut should zero which is a contradiction to the fractional values for $x_e$s). Here i≠u otherwise, u has degree three and thus three extra tokens and we have at least four tokens for R. It means i ∈ C which is again a, contradiction since, the current cut for C violates the cut condition for i in the LP.

Finally, it is worth mentioning though we guarantee that during the course of the algorithm, we can get a variable Which is only one-third-integral, in the first iteration always we can find an integral z variable. Below there is a more general proposition regarding this issue.

Proposition 8 If there is a set S of fractional variables which contains exactly one variable from each tight constraint in our laminar family, our solution cannot be a basic optimum solution. In particular, there is no basic optimum solution in which all constraints are tight with fractional z variables.

Proof: The second statement follows immediately by taking set S in the first statement to be the set of all fractional z variables. The first statement follows from the fact that we can always increase (decrease) each variable $\omega$ in set S by $\epsilon(1-\omega)$, for a very small $\epsilon>0$, and decrease (increase) each other variable u by $\epsilon u$ (increase/decrease is depending on which option does not increase the objective function). It is easy to see that in this way we can always get another feasible solution which makes all our current constraints in the laminar family tight and whose value is not larger than that of optimum.

What is claimed is:

1. An approximation method carried out by computer readable program code operable by a computer system for designing a minimum cost network from defined available network elements having values for cost, required pairs, connectivity requirements and penalty costs for insufficient connectivity by selecting from these available elements, comprising:
   constructing a linear programming (LP) relaxation for a graph having edges and vertices with values corresponding to those of the available network elements;
   finding an optimal basic solution to the LP;
   applying a selection criterion to penalty costs and edge costs identified in the optimal basic solution and including the selected penalty costs and edges in the minimum cost network;
   constructing a residual LP relaxation including remaining pairs with unsatisfied connectivity and edges; and
   fixing selected edge coefficient values to 1 in the residual LP;
   repeating the steps of the method to include additional penalty costs and edge costs in the minimum cost network until all connectivity requirements are satisfied.

2. An approximation method as claimed in claim 1 wherein the step of applying the selection criterion comprises selecting a number $\alpha$, and including all penalty costs and edges in the minimum cost network that are identified in the optimal basic solution with coefficients $\geq \alpha$.

3. An approximation method as claimed in claim 1 wherein $\alpha = 1/3$.

4. An approximation method as claimed in claim 1 wherein the step of applying the selection criterion comprises including the penalty cost and edge in the minimum cost network that are identified in the optimal basic solution with the maximum coefficient values.

5. An approximation method as claimed in claim 1 wherein the connectivity requirement for each required pair is for a single connection between the vertices of the pair.

6. An approximation method as claimed in claim 1 wherein the connectivity requirement for at least one required pair is for a plurality of independent connections between the vertices of the pair.

7. An approximation method as claimed in claim 1 wherein the method provides a 3-approximation algorithmic solution.

8. An approximation method as claimed in claim 1 further comprising:
   selecting from the available network elements at least some that correspond to edges selected for inclusion in the minimum cost network.

9. An approximation method as claimed in claim 1 wherein the minimum cost network to be designed is a telecommunications network, and wherein the network elements include transmission links.

10. An approximation method as claimed in claim 9 wherein the transmission links are fiber optic transmission links.

11. An approximation method as claimed in claim 1 wherein the minimum cost network to be designed is a package delivery network, and wherein the network elements include transportation links.

12. An approximation method as claimed in claim 1 wherein the minimum cost network to be designed is a telecommunications network, wherein the network elements include transmission links with construction costs, the required pairs are pairs of nodes required to be connected in the network, the connectivity requirements set the number of independent paths between the nodes of a pair that the network is required to supply, and the penalty costs are the costs of buying transmission capacity from commercial sources to form paths between nodes of a required pair to satisfy connectivity requirements.

13. An approximation method for designing a minimum total cost network by selecting from a collection of available network elements which include nodes and links connecting the nodes, comprising:
   selecting graph edges to correspond to the available links;
   assigning edge costs that correspond to the link costs;
   selecting graph vertices to correspond to nodes;
   selecting pairs of vertices that are required to be in the network;
   assigning connectivity requirements for all required pairs of vertices;
   assigning penalty costs to the required pairs if their connectivity requirements are not satisfied;
   constructing a linear programming (LP) relaxation incorporating values for edge costs, pair requirements, connectivity requirements and penalty costs and having coefficients for edge costs and penalty costs as variables;
   finding an optimal basic feasible solution to the LP;
   applying a selection criterion to pair connectivities and edges in the optimal basic solution;
   paying a penalty cost for each pair connectivity selected according to the selection criterion and including the penalty cost in the network solution;
   including each edge selected according to the selection criterion in the network solution;
   forming a residual graph including all remaining required pairs with unpaid connectivity requirements and including all edges;
   constructing a residual LP for the residual graph in which edge coefficients for edges selected according to the selection criterion are set to 1 and other edge coefficients are variables;
   iteratively repeating the previous steps from the finding step to the constructing step until all connectivity requirements of the required pairs are determined to be satisfied; and
   selecting network links corresponding to at least some edges identified in the network solution to include in the minimum cost network.

14. An approximation method as claimed in claim 13 wherein the step of applying the selection criterion comprises selecting a number $\alpha$, and including all penalty costs and edges in the minimum cost network that are identified in the optimal basic solution with coefficients $\geq \alpha$.

15. An approximation method as claimed in claim 14 wherein $\alpha=\frac{1}{3}$.

16. An approximation method as claimed in claim 13 wherein the step of applying the selection criterion comprises including the penalty cost and edge in the minimum cost network that are identified in the optimal basic solution with the maximum coefficient values.

17. An approximation method as claimed in claim 13 wherein the connectivity requirement for each required pair is for a single connection between the vertices of the pair.

18. An approximation method as claimed in claim 13 wherein the connectivity requirement for at least one required pair is for a plurality of independent connections between the vertices of the pair.

19. A system for designing a minimum cost network from defined available network elements having values for cost, required pairs, connectivity requirements and penalty costs for insufficient connectivity by selecting from these available elements, comprising:
   means for providing a linear programming (LP) relaxation for a graph having edges and vertices with values corresponding to those of the available network elements;
   means for finding an optimal basic solution to the LP;
   means for applying a selection criterion to penalty costs and edge costs identified in the optimal basic solution and including the selected penalty costs and edges in the minimum cost network;
   means for providing a residual LP relaxation including remaining pairs with unsatisfied connectivity and edges; and
   means for fixing selected edge coefficient values to 1 in the residual LP; means for repeating the steps of the method to include additional penalty costs and edge costs in the minimum cost network until all connectivity requirements are satisfied.

20. A system as claimed in claim 19 wherein the means for applying the selection criterion comprises means for selecting a number $\alpha$, and means for including all penalty costs and edges in the minimum cost network that are identified in the optimal basic solution with coefficients $\geq \alpha$.

21. A system as claimed in claim 20 wherein $\alpha=\frac{1}{3}$.

22. A system as claimed in claim 19 wherein the means for applying the selection criterion comprises means for including the penalty cost and edge in the minimum cost network that are identified in the optimal basic solution with the maximum coefficient values.

23. A computer program product for causing a computer to design a minimum total cost network from defined available network elements having values for cost, required pairs, connectivity requirements and penalty costs for insufficient connectivity by selecting from these available elements, comprising:
   computer readable program code means for providing a linear programming (LP) relaxation for a graph having edges and vertices with values corresponding to those of the available network elements;
   computer readable program code means for finding an optimal basic solution to the LP;
   computer readable program code means for applying a selection criterion to penalty costs and edge costs identified in the optimal basic solution and including the selected penalty costs and edges in the minimum cost network;
   computer readable program code means for providing a residual LP relaxation including remaining pairs with unsatisfied connectivity and edges; and
   computer readable program code means for fixing selected edge coefficient values to 1 in the residual LP;
   computer readable program code means for repeating the steps of the method to include additional penalty costs and edge costs in the minimum cost network until all connectivity requirements are satisfied.

24. A computer program product as claimed in claim 23 wherein the computer readable program code means for applying the selection criterion comprises computer readable program code means for selecting a number $\alpha$, and computer readable program code means for including all penalty costs and edges in the minimum cost network that are identified in the optimal basic solution with coefficients $\geq \alpha$.

25. A computer program product as claimed in claim 24 wherein $\alpha=\frac{1}{3}$.

26. A computer program product as claimed in claim 23 wherein the computer readable program code means for applying the selection criterion comprises computer readable program code means for including the penalty cost and edge in the minimum cost network that are identified in the optimal basic solution with the maximum coefficient values.

27. A minimum cost network assembled from defined available network elements having values for cost, required pairs, connectivity requirements and penalty costs for insufficient connectivity by selecting from these available elements using a method carried out by computer readable program code operable by a computer system comprising:
   constructing a linear programming (LP) relaxation for a graph having edges and vertices with values corresponding to those of the available network elements;
   finding an optimal basic solution to the LP;
   applying a selection criterion to penalty costs and edge costs identified in the optimal basic solution and including the selected penalty costs and edges in the minimum cost network;
   constructing a residual LP relaxation including remaining pairs with unsatisfied connectivity and edges; and
   fixing selected edge coefficient values to 1 in the residual LP;
   repeating the steps of the method to include additional penalty costs and edge costs in the minimum cost network until all connectivity requirements are satisfied;
   selecting from the available network elements at least some that correspond to edges selected for inclusion in the minimum cost network.

* * * * *